US010583363B2

(12) United States Patent
Tsuda et al.

(10) Patent No.: US 10,583,363 B2
(45) Date of Patent: Mar. 10, 2020

(54) GAME SYSTEM, GAME PROCESS CONTROL METHOD, AND GAME APPARATUS

(71) Applicant: NINTENDO CO., LTD., Kyoto (JP)

(72) Inventors: Munetaka Tsuda, Kyoto (JP); Yuki Otaki, Kyoto (JP); Masahiro Yoshino, Kyoto (JP); Hideyuki Tatsuta, Kyoto (JP); Yosuke Oshino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 816 days.

(21) Appl. No.: 15/091,723

(22) Filed: Apr. 6, 2016

(65) Prior Publication Data

US 2017/0165574 A1 Jun. 15, 2017

(30) Foreign Application Priority Data

Dec. 15, 2015 (JP) .................................. 2015-244476

(51) Int. Cl.
*A63F 13/537* (2014.01)
*A63F 13/31* (2014.01)
(Continued)

(52) U.S. Cl.
CPC ............ *A63F 13/537* (2014.09); *A63F 13/31* (2014.09); *A63F 13/352* (2014.09); *A63F 13/63* (2014.09);
(Continued)

(58) Field of Classification Search
CPC ...... A63F 13/537; A63F 13/31; A63F 13/352; A63F 13/63; A63F 13/69; A63F 13/77; A63F 13/35
(Continued)

(56) References Cited

U.S. PATENT DOCUMENTS

2003/0023752 A1*  1/2003  Williamson ...... H04L 29/12009
                                                         709/245
2004/0128250 A1*  7/2004  Fox ........................ G06Q 30/06
                                                          705/52
(Continued)

FOREIGN PATENT DOCUMENTS

JP        2006-301734       11/2006
JP        2013-250738       12/2013
JP        2014-174911        9/2014

OTHER PUBLICATIONS

Extended European Search Report dated Jun. 8, 2017 issued in European Patent Application No. 16160438.4, (11 pages).
(Continued)

*Primary Examiner* — Dmitry Suhol
*Assistant Examiner* — Ryan Hsu
(74) *Attorney, Agent, or Firm* — Nixon & Vanderhye, P.C.

(57) ABSTRACT

In a game apparatus, a game program and a web browser program are stored. In a web browser process, a predetermined web page is displayed, first access destination information is acquired on the basis of a user operation, and the first access destination information is outputted to be usable in the game process. In a game process, a server is accessed on the basis of the first access destination information, a predetermined content corresponding to the first access destination information is acquired, and the game process is executed using the predetermined content.

22 Claims, 17 Drawing Sheets

B1: ACTIVATE BROWSER BY CALL-BACK FROM GAME PROGRAM (CB ACTIVATION)
B2: PORTAL SITE ACCESS FOR CB ACTIVATION
B3: TRANSMIT WEB PAGE DATA
B4: CLICK "IMMEDIATELY" IN PAGE → RETURN ACQUIRED FIRST URL AS RETURN VALUE TO GAME PROGRAM
B5: ANALYZE FIRST URL TO GENERATE SECOND URL, AND ACCESS SECOND URL
B6: DOWNLOAD COURSE DATA CORRESPONDING TO SECOND URL

(51) Int. Cl.
    *A63F 13/352*    (2014.01)
    *A63F 13/69*     (2014.01)
    *A63F 13/77*     (2014.01)
    *A63F 13/63*     (2014.01)
    *A63F 13/35*     (2014.01)

(52) U.S. Cl.
    CPC .............. *A63F 13/69* (2014.09); *A63F 13/77*
                      (2014.09); *A63F 13/35* (2014.09)

(58) Field of Classification Search
    USPC .......................................................... 463/31
    See application file for complete search history.

(56) References Cited

U.S. PATENT DOCUMENTS

2014/0179425 A1* 6/2014 Perry ...................... A63F 13/12
                                                        463/31
2014/0278872 A1    9/2014 Shimizu et al.

OTHER PUBLICATIONS

Apple: "In-App Purchase Programming Guide ", Oct. 22, 2013, XP055370930, Retrieved from the Internet: URL:https://webbeta.archive.org/web/20150612194309/https://developer.apple.com/library/ios/documentation/NetworkingInternet/Conceptual/StoreKitGuide/StoreKitGuide.pdf [retrieved on May 9, 2017] pp. 12-16 (48 pages).
Sburel :"InApp purchasing through a webview | Apple Developer Forums", Aug. 28, 2015, XP055370946, Retrieved from the Internet: URL:https://forums.developer.apple.com/thread/15891 [retrieved on May 9, 2017] *p. 1* (1 page).
Luigi Auriemma et al.,: "Steam Browser Protocol Insecurity (When Local Go Remote)", Oct. 15, 2012, XP055372848, Retrieved from the Internet: URL:https://revuln.com/files/ReVuln_Steam_Browser_Protocol_Insecurity.pdf [retrieved Bugs on May 8, 2017], *pp. 1,2,6 *(10 pages).
Anonymous:"Steam browser protocol", Mar. 12, 2015, XP055370948, Retrieved from the Internet: URL:https://developer.valvesoftware.com/w/index.php?title=Steam_browser_protocol&oldid=189887, [retrieved on May 9, 2017] * p. 1 * (5 pages).
Anonymous : "Steam Workshop—Valve Developer Community", May 12, 2015, XP055373013, Retrieved from the Internet: URL:https://developer.valvesoftware.com/wiki/Steam_Workshop [retrieved on May 8, 2017], * p. 1* (2 pages).

* cited by examiner

A1: ACCESS CONTENT SERVER TO REQUEST COURSE DATA BY USING DEDICATED VIEWER FUNCTION IN GAME PROGRAM

A2: DOWNLOAD REQUESTED COURSE DATA

B1: ACTIVATE BROWSER BY CALL-BACK FROM GAME PROGRAM (CB ACTIVATION)

B2: PORTAL SITE ACCESS FOR CB ACTIVATION

B3: TRANSMIT WEB PAGE DATA

B4: CLICK "IMMEDIATELY" IN PAGE → RETURN ACQUIRED FIRST URL AS RETURN VALUE TO GAME PROGRAM

B5: ANALYZE FIRST URL TO GENERATE SECOND URL, AND ACCESS SECOND URL

B6: DOWNLOAD COURSE DATA CORRESPONDING TO SECOND URL

FIG. 9

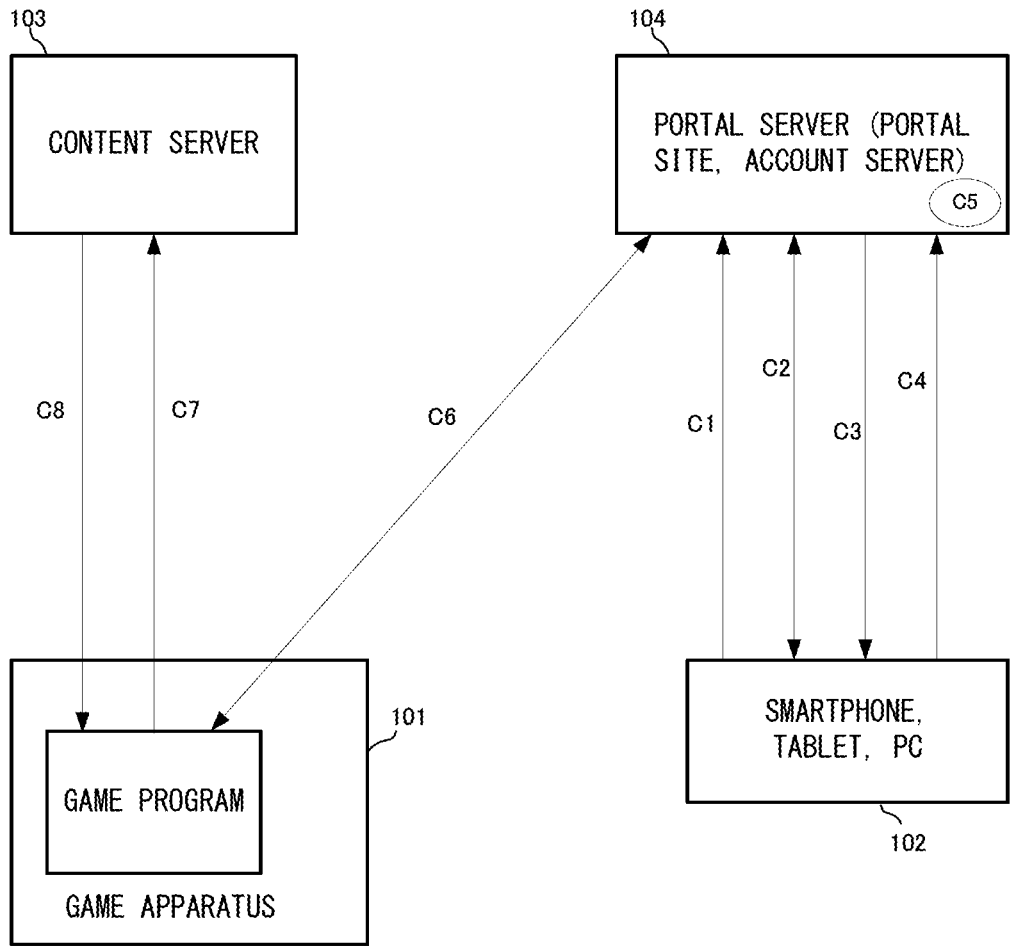

C1: ACCESS OPEN-TO-PUBLIC URL OF PORTAL SITE

C2: LOG-IN PROCESS BASED ON MEMBER ID

C3: TRANSMIT WEB PAGE DATA OF PORTAL SITE

C4: SPECIFY "LATER"

C5: ASSOCIATE SPECIFIED COURSE ID WITH LOG-IN ID, AND STORE AS "LATER" LIST

C6: ACQUIRE "LATER" LIST FROM GAME PROGRAM, USE LOG-IN ID TO PORTAL SERVER WHICH IS STORED IN GAME APPARATUS

C7: REQUEST COURSE DATA SELECTED FROM "LATER" LIST

C8: DOWNLOAD SELECTED COURSE DATA

FIG. 12

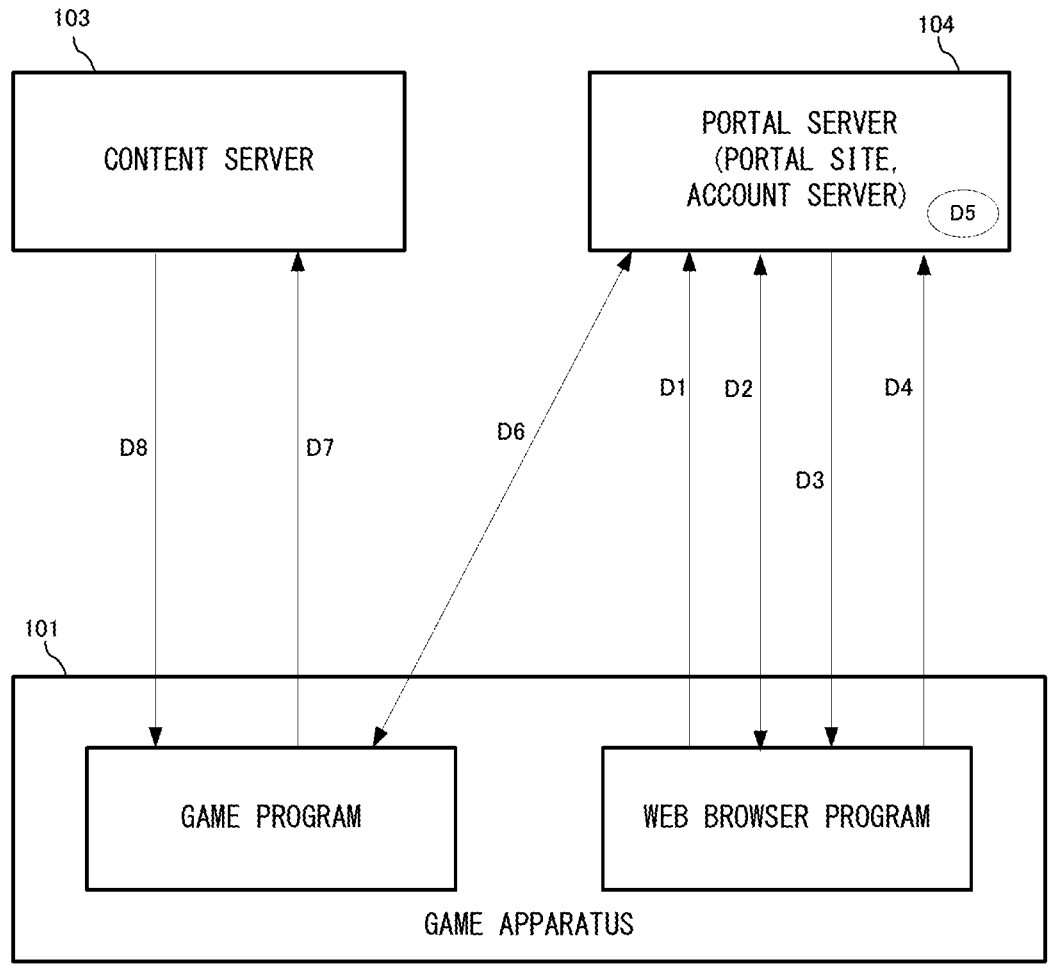

D1: ACCESS OPEN-TO-PUBLIC URL OF PORTAL SITE

D2: LOG-IN PROCESS BASED ON MEMBER ID, USING LOG-IN ID STORED IN GAME APPARATUS

D3: TRANSMIT WEB PAGE DATA OF PORTAL SITE

D4: SPECIFY "LATER"

D5: ASSOCIATE SPECIFIED COURSE ID WITH LOG-IN ID, AND STORE AS "LATER" LIST

D6: ACQUIRE "LATER" LIST FROM GAME PROGRAM, USE LOG-IN ID TO PORTAL SERVER WHICH IS STORED IN GAME APPARATUS

D7: REQUEST COURSE DATA SELECTED FROM "LATER" LIST

D8: DOWNLOAD SELECTED COURSE DATA

GAME SYSTEM, GAME PROCESS CONTROL METHOD, AND GAME APPARATUS

CROSS REFERENCE TO RELATED APPLICATION

The disclosure of Japanese Patent Application No. 2015-244476, filed on Dec. 15, 2015, is incorporated herein by reference.

FIELD

The exemplary embodiments herein relate to a game system including a game apparatus and at least one server, and more particularly relate to a method of acquiring predetermined content data.

BACKGROUND AND SUMMARY

Conventionally, a content sharing system has been known, in which a user uploads a self-made content or the like to a predetermined server, thereby to post the content. In this system, the posted content is presented to other users so that the other users can browse the content, and evaluate the content.

In the content sharing system as described above, for example, when there occurs a situation that the setting of content posting, presentation, browsing, or the like should be changed, both a client program that operates on the user terminal and a server program that operates on the server need to be changed. In addition, in many cases, the content of the change or the like is complicated, and the load on the developer side required for the setting change work is considerable.

Therefore, an object of the exemplary embodiment is to provide a game system and the like in which update (e.g., addition of functions) or the like of a program for executing data exchange between a user terminal and a server can be facilitated by using a browser program.

In order to attain the object described above, the following configurations are exemplified.

A configuration example is a game system including a game apparatus, and at least one server communicating with the game apparatus. The game apparatus includes a web page request section, a web page display section, a first information acquisition section, a first information output section, a first information input section, a content request section, and a content-based process execution section. The server includes a web page transmission section and a content transmission section. The web page request section requests the server to transmit a predetermined web page, in a web browser process according to execution of a web browser program. The web page display section, in the web browser process, displays the predetermined web page transmitted from the server. The first information acquisition section, in the web browser process, acquires first access destination information on the basis of operation data indicating an operation performed on the predetermined web page by a user. The first information output section, in the web browser process, outputs the first access destination information so as to be usable in a game process according to execution of a game program. The first information input section, in a game process according to execution of the game program, inputs the first access destination information outputted from the first information output section in the web browser process. The content request section, in the game process, requests the server to transmit a predetermined content corresponding to the first access destination information, on the basis of the first access destination information. The content-based process execution section, in the game process, executes the game process using the content transmitted from the server. In addition, the web page transmission section transmits the predetermined web page to the game apparatus in response to the request from the game apparatus. The content transmission section transmits the predetermined content to the game apparatus in response to the request from the game apparatus.

According to the above configuration example, when the content to be used in the game process is acquired from the server, the access destination information acquired in the web browser process is used. Therefore, the development load in the game program development stage can be reduced, and update and the like of the web browser process can be easily performed even after release of the game program. As a result, speedy response to user's needs is achieved, and thus the convenience for the user is improved.

In another configuration example, the game apparatus may further includes an activation section which, in the game process, activates the web browser program with an URL of the predetermined web page being specified. The web page request section may request the predetermined web page, in the web browser process according to execution of the web browser program activated by the activation section. Further, the activation section may activate the web browser program with a request for a return value from the web browser program being further specified. Still further, the first information output section may output the first access destination information as the return value. Moreover, the first information acquisition section may acquire the first access destination information included in the predetermined web page, on the basis of the operation data.

According to the above configuration example, in the game process, the convenience for the user can be improved with respect to a series of works that the user should perform to acquire the content. For example, the user need not perform complicated operations such as ending the game process and then manually activating the browser, and the user is allowed to perform an operation to acquire the content seamlessly between the game process and the browser.

In another configuration example, the game system may include a first server capable of providing the first access destination information, and a second server in which the content is stored. The web page request section may request the predetermined web page from the first server. The first access destination information may be information used to request the predetermined content from the second server. The content request section may request the predetermined content from the second server, on the basis of the first access destination information.

In addition, the content request section may include a second information generation section which generates second access destination information on the basis of the first access destination information. Further, the first access destination information may be information indicating a predetermined character string which is not a link to the second server. The second access destination information may be information indicating a download link of the content stored in the second server. The content request section may request the predetermined content from the second server, by using the second access destination information.

Further, the second server and the game apparatus may be connected to each other via a dedicated network, and only a request from the game apparatus may be allowed as a request to the second server.

According to the above configuration example, illegal acquisition or the like of content data is avoided, and thus the security relating to acquisition of contents is improved.

The first server may be connected to the second server, acquire content information relating to the content from the second server, and generate the predetermined web page on the basis of the content information.

According to the above configuration example, even when there are a large number of contents to be added and/or updated, information thereof can be promptly reflected in the web page, whereby the convenience for the user can be improved.

In another configuration example, the game apparatus may further include a browser screen shift section which activates the web browser program when the game process performed using the content by the content-based process execution section is ended and then a predetermined operation performed by the user is received, and requests the predetermined web page from the server and displays the web page, in the web browser process according to execution of the web browser program. Further, the browser screen shift section may access a web page on which information about the content relating to the ended game process is displayed, and display the web page of the information about the content.

According to the above configuration example, it is possible to present, to the user, information relating to a content that has just been played after a game process using a certain content, whereby the convenience for the user can be further improved.

In another configuration example, in the web browser process, at least a first button image and a second button image may be included in the web page displayed on the web page display section. Further, the first information acquisition section may acquire the first access destination information corresponding to the second button image when the operation data indicates an operation to select the second button image. The game system may further include a list registration section which, when the operation data indicates an operation to select the first button image, registers information indicating a content associated with the first button image, in predetermined list data stored in the server. Further, the game apparatus may further includes: a list acquisition section which acquires the predetermined list data from the server in response to an operation performed by the user; and a list content acquisition section which acquires, from the server, the content corresponding to the information stored in the list data, in response to an operation performed by the user.

Further, when a predetermined operation to access the server is received, in the web browser process activated in response to a call-up from the game process, a first URL may be specified, whereby the web page including the first button image and the second button image is acquired. On the other hand, in the web browser process activated not by a call-up from the game process, a second URL different from the first URL may be specified, whereby a web page in which the second button image is not included is acquired. In addition, the game system may include a general-purpose information processing apparatus. The information processing apparatus may display a predetermined web page in which the first button image is included and the second button image is not included, in the web browser process according to execution of the web browser program. The game system may register, in the predetermined list data, information indicating the content associated with the first button image, when the operation performed on the predetermined web page by the user is an operation to select the first button image.

According to the above configuration example, the user is allowed to access a site for searching for a content, through either of a general-purpose information processing terminal such as a smartphone, and a game-dedicated apparatus. In the case of the access through the general-purpose information processing terminal, the user is allowed to register only reservation for download of the content on the basis of an operation to the first button image, for example. On the other hand, in the case of the access through the game-dedicated apparatus, since the second button image is displayed, the user is allowed to immediately download and play the content.

In another configuration example, the content may be data for constructing a virtual game space in a game process in which player objects are controlled, and may be data created and posted by a user. In addition, the content may be data to be temporarily used for a process using the content in the game process.

According to the above configuration example, regarding data used in the game process and having high frequency of update, the user is allowed to easily add or update a function relating to search or acquisition of such data, after release of the game.

Another configuration example is a game apparatus capable of communicating with a predetermined server. The game apparatus includes a browser activation section, a first information generation section, a first information output section, a browser activation section, and a first-information-based processing section. The browser activation section, as a part of a function of a predetermined game process, calls up a web browser program operating on the game apparatus from the game process. The first information generation section generates first information on the basis of communication with the predetermined server, in a web browser process according to execution of the web browser program. The first information output section, in the web browser process, outputs the first information to the game process from which the web browser program has been called up. The first-information-based processing section, as a part of the function of the game process, executes a process using the first information.

According to the above configuration example, since the web browser program is used as a part of the game process executed by the game program, the user is allowed to easily add or update a function to be realized by the web browser program, after release of the game.

Another configuration example is a game system including at least a predetermined server, and a game apparatus capable of communicating with the predetermined server. The game system includes a web browser process execution section, and a native application execution section. The web browser process execution section realizes a search function for searching for a content to be used in a predetermined game process, by communicating with the predetermined server. The native application execution section executes the predetermined game process, activates the web browser program in the game process, and acquires a result of the search for the content in a process relating to execution of the activated web browser program.

According to the above configuration example, the function to search for a content to be used in the game process can be realized by a so-called web application, whereby addition, expansion, or update of the search function can be easily performed as compared to the case where the game program itself is updated.

Another configuration example is a game system including a first-type information processing apparatus, a second-type information processing apparatus, a first server, and a second server. The first server includes a search site data storage section and a web page transmission section. The search site data storage section stores therein data that provides a search site for searching for a content to be used in a predetermined game process. The web page transmission section transmits a web page relating to the search site, in response to a request from the first-type information processing apparatus or the second-type information processing apparatus. When the first server is accessed from the first-type information processing apparatus, the web page transmission section generates a web page including link information for downloading the content from the second server, and transmits the web page to the first-type information processing apparatus. When the first server is accessed from the second-type information processing apparatus, the web page transmission section generates web page data which does not include the link information, and transmits the web page to the second-type information processing apparatus. Further, the first-type information processing apparatus includes: a content download section which accesses the second server on the basis of the link information, in response to an operation performed by a user, and downloads the content into the first-type information processing apparatus; and a content-based processing section which executes a game process using the downloaded content. The second-type information processing apparatus includes a web page display section which displays the web page transmitted from the web page transmission section. The second-type information processing apparatus may be an information processing apparatus incapable of executing the game process using the content.

According to the above configuration example, the user is allowed to access the search site through either of the game-dedicated apparatus and the general-purpose information processing apparatus such as a smartphone, and to execute content search. In addition, the search function is operated on the web browser, and therefore can be easily expanded. Further, when the user accesses the search site from the game-dedicated apparatus, the user, after execution of search, is allowed to instantly download the content based on the search result and execute game play using the content. Thus, the convenience for the user can be improved.

According to the present embodiment, the access destination information to the server, for acquiring predetermined content data, can be acquired in the web browser process and outputted to the game process side. Thus, when the function relating to the process to acquire the access destination needs to be expanded, the expansion can be easily realized as compared to the case where the game program itself is updated. In addition, the load in the game program development stage can be reduced.

BRIEF DESCRIPTION OF THE DRAWINGS

FIG. 9 is a schematic diagram showing a flow of download in a first "later" route;

FIG. 12 is a schematic diagram showing a flow of download in a second "later" route;

DETAILED DESCRIPTION OF NON-LIMITING EXAMPLE EMBODIMENTS

Hereinafter, an exemplary embodiment will be described.

Figure 1:
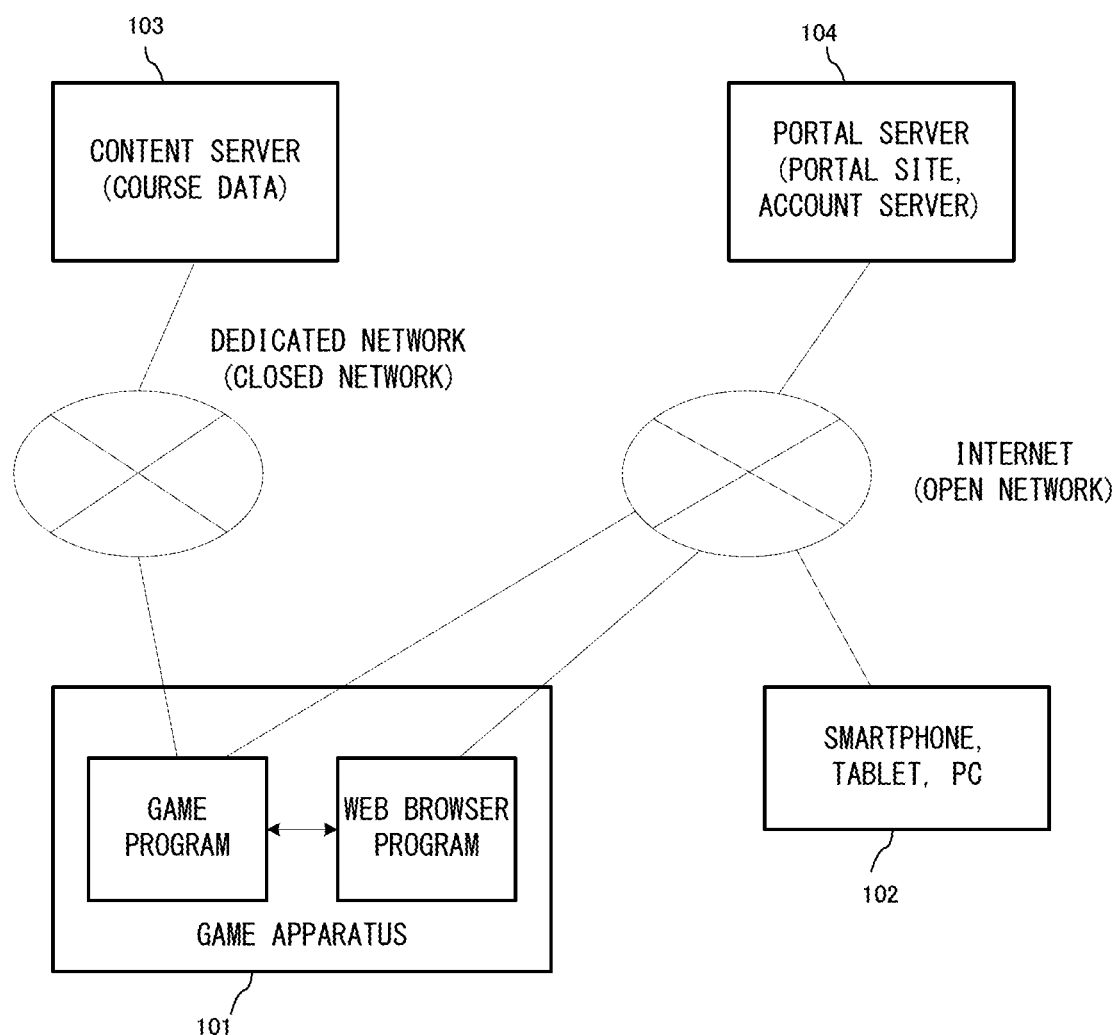
FIG. 1 is a schematic view showing the whole image of a game system which is a non-limiting example of an embodiment.

FIG. 1 is a schematic diagram showing the entire image of a game system according to the present embodiment. The game system according to the present embodiment includes a game apparatus 101, an information processing terminal 102, a game content server 103 (hereinafter referred to as a content server), and a portal site server 104 (hereinafter referred to as a portal server). In the game apparatus 101, a game program 221 and a web browser program 222 described later are included to be executable. The information processing terminal 102 is a general-purpose information processing terminal typified by, for example, a smartphone, a tablet-type information processing apparatus, a personal computer, and the like. The content server 103 and the game apparatus 101 are communicable with each other through a dedicated network (closed network) using a unique protocol. The portal server 104, the game apparatus 101, and the information processing terminal 102 such as a smartphone are configured to be communicable with each other through the Internet (open network).

In the present embodiment, in the above system, a user is allowed to search for a content (specifically, course data) as described later, from the game apparatus 101 and the information processing terminal 102. It is assumed that a function is realized which allows the user to download the content with the game apparatus 101 and play the content. In the present embodiment, data of this content is stored in the content server 103. In addition, the portal server 104 stores therein data of a portal site for search of the content. In the present embodiment, the portal site is a membership site, and a log-in process is required for access to the portal site. The portal server 104 also serves as an account server for managing member IDs and the like.

Figure 2:
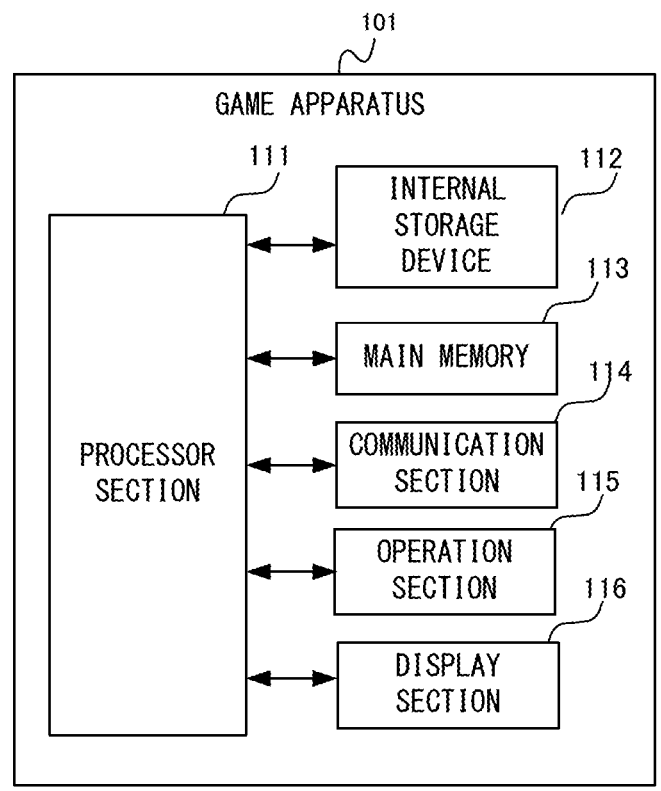
FIG. 2 is a functional block diagram showing a game apparatus 101.

Next, the hardware configuration in the above-described system will be described. FIG. 2 is a functional block diagram of the game apparatus 101. With reference to FIG. 2, the game apparatus 101 includes a processor section 111, an internal storage device 112, a main memory 113, a communication section 114, an operation section 115, and a display section 116. The processor section 111 executes a system program (not shown) for executing the later-described game program and web browser program, and controlling the overall operation of the game apparatus 101, thereby controlling the operation of the game apparatus 101. The processor section 111 may include a single processor or a plurality of processors. The internal storage device 14 stores therein various programs to be executed by the processor section 111, and various kinds of data to be used in the programs. The internal storage device 14 is, for example, a flash EEPROM or a hard disk device. The main memory 15 temporarily stores therein computer programs and information. The communication section 16 is connected to a network by means of wired or wireless communication, and transmits/receives predetermined data to/from the content server 103 and the portal server 104. The operation section 115 is, for example, a cross switch, a push button, or a touch panel. The display section 116 is typically a liquid crystal display unit. In another embodiment, as the display section 116, a monitor of a television or a PC, connected to the game apparatus 101, may be used.

Figure 3:
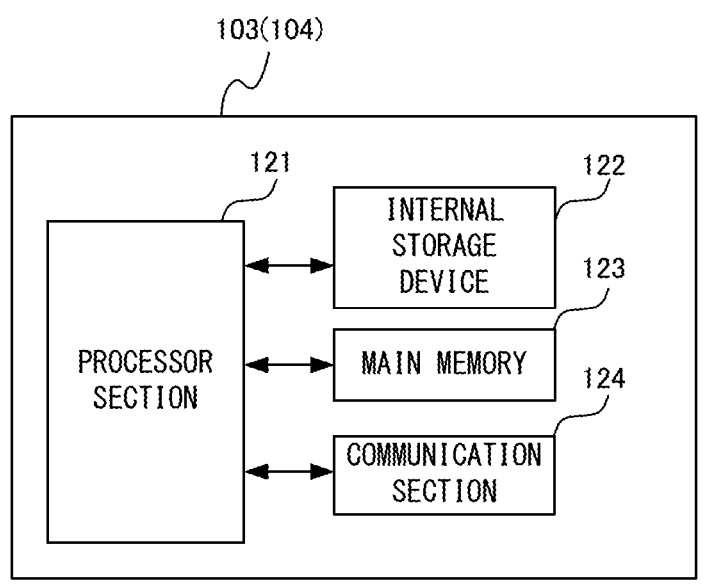
FIG. 3 is a functional block diagram showing a content server 103 (portal server 104)

Next, the configurations of the content server 103 and the portal server 104 will be described. In the present embodiment, these serves 103 and 104 have the same hardware configuration. FIG. 3 is a functional block diagram showing the content server 103 (portal server 104). The content server 103 (portal server 104) includes at least a processor section 121, an internal storage device 122, a main memory 123, and a communication section 124. The processor section 121 executes various programs for controlling the server. The internal storage device 122 stores therein various programs to be executed by the processor section 121, and various kinds of data to be used therein. The main memory 123 temporarily stores therein computer programs and information. The communication section 124 is connected to the network by means of wired or wireless communication, and transmits/receives predetermined data to/from the game apparatus 101 and the information processing terminal 102.

Next, the information processing terminal such as a smartphone will be described. Since the hardware configuration thereof is basically equivalent to that of the game apparatus 101, detailed description thereof will be omitted.

Next, an operation outline of information processing executed by the game system according to the present embodiment will be described. First, a game process assumed in the present embodiment will be described. In the game process assumed in the present embodiment, a user creates a game stage and posts the game stage to the server, or downloads a game stage created by another user and plays the game stage. For example, various kinds of parts for constituting a "course" (game stage) in a 2D horizontal scrolling type jump action game are prepared as game data. A user can create the "course" by placing the parts in a virtual game space. The created course is uploaded (posted) to the content server 103 and stored therein. The user is also allowed to download a course created by another user in a similar manner, from the content server 103, and play the downloaded course (of course, the user is allowed to play the course created by himself/herself).

In such a game, it is assumed that many users post courses created by themselves. Therefore, it is desirable to reduce the burden on each user when the user selects a course to be downloaded. Therefore, the present embodiment also provides a function of presenting, to the user, previously extracted courses such as "popularity ranking", and a function of allowing the user to specify search conditions and search for his/her desired course. Specifically, in the present embodiment, a "portal site" for course search is constructed on the portal server 104. Since this portal site is present on the Internet, the user can access and browse the portal site from the information processing terminal 102 such as a smartphone, or the web browser program of the game apparatus 101. The user can search for a "course" on the portal site. When the user searches for a course by using a smartphone, the user can register a reservation for download of the course he/she wants to download, by pressing a "later" button (described later). Then, the user can activate the game program later to download the reserved course. Besides, when the user accesses the content server 103 from the "dedicated viewer" in the game program, some courses in the form of "popularity ranking" or the like may be presented to the user so that the user can select and download a course.

In the present embodiment, the portal site is a membership site as described above, and log-in is required for use of the portal site, in principle. Therefore, when the user accesses the portal site from the information processing terminal 102 such as a smartphone, first, the user is requested to enter a member ID and a password for the log-in process. The information, such as the member ID and the password, necessary for the log-in process is stored in the portal server 104 (function as an account server). On the other hand, in the game apparatus 101, the user is requested to enter the member ID and the password when the game apparatus is initially started up. The member ID and the password entered by the user in response to the request can be stored in the game apparatus 101. Therefore, the member ID and the like are referred to and used as appropriate in various game programs and browsers executed on the game apparatus. That is, once the member ID and the like are entered and stored in the game apparatus 101 at the first start-up of the game apparatus 101, the user is saved the trouble of entering the member ID and the like each time log-in is requested thereafter.

By the way, in the present embodiment, four types of download modes (routes from course selection to download) as follows are provided regarding the above-described download of courses:

(1) download using the dedicated viewer on the game apparatus (dedicated viewer route);

(2) instant download using the web browser on the game apparatus (instant route);

(3) "later" download with a reservation for download made from a smartphone or the like (first "later" route); and (4) "later" download with a reservation for download made by using the web browser on the game apparatus (second "later" route).

In the present embodiment, the user is allowed to download and play only one course at a time. In principle, play of the download course is a temporary one. In other words, after having played a course, if the user wants to play another course, download of the course is required each time. As for the timing to erase data relating to a downloaded course, the data may be erased when the play of the course is ended, or when another course is downloaded after the play of the course has ended. Alternatively, the data may be erased when the game is ended.

Hereinafter, the outlines of the four download modes will be described.

<1: Dedicated Viewer Route>

Figure 4:
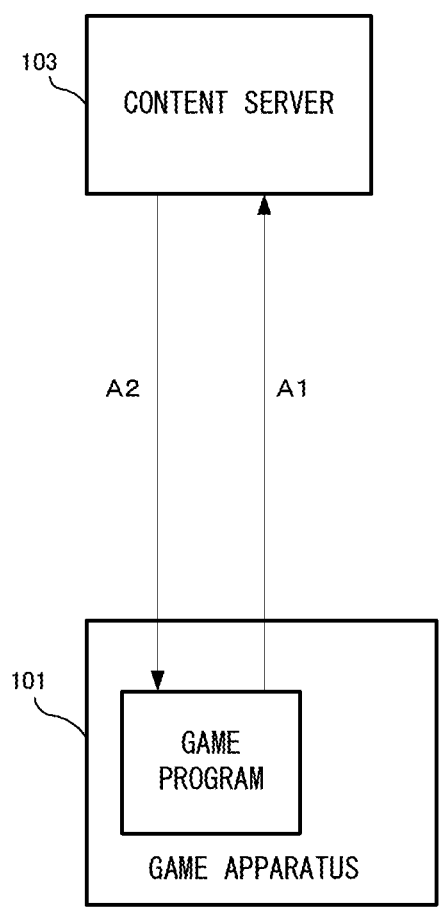
FIG. 4 is a schematic diagram showing a flow of a download process of course data in a dedicated viewer route.
Figure 5:
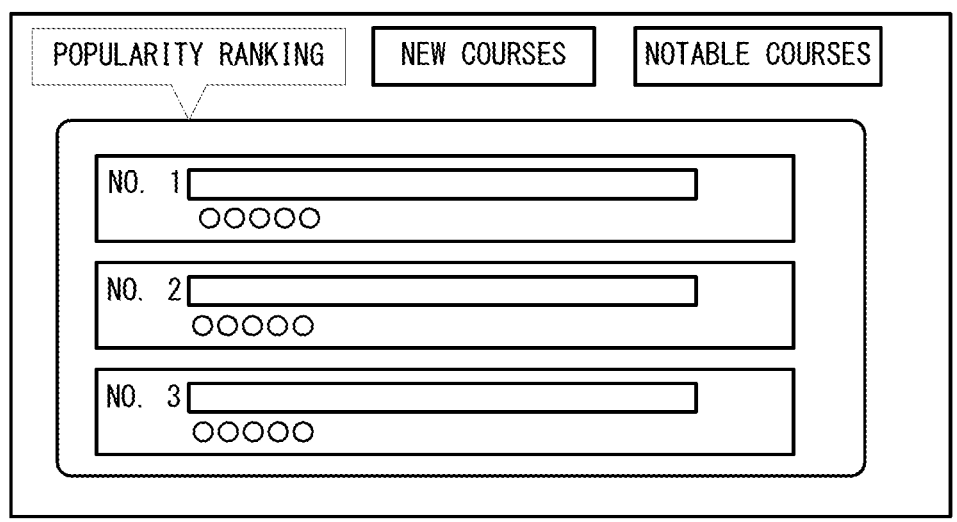
FIG. 5 is an example of a screen of a dedicated viewer displayed on the game apparatus 101.

FIG. 4 is a schematic diagram showing the flow of a course data download process according to the dedicated viewer route. In this mode, by using a dedicated viewer function directly provided by the game program, data of "course" (hereinafter referred to as course data) is instantly downloaded from the content server 103. For example, when the game program is activated, a main menu is displayed. It is assumed that this main menu includes items such as "dedicated viewer", "search with web browser", and "browse "later" list". When the user selects the item of "dedicated viewer" from the main menu, the dedicated viewer is activated. FIG. 5 shows an example of a screen of the dedicated viewer displayed on the game apparatus 101. In this screen, as "popularity ranking", information such as the outlines, creators, and the like of courses having large number of downloads are displayed. The user performs an operation on this screen to select a course (e.g., the most preferred course) the user wants to download. In response to this selecting operation, the game apparatus 101 accesses the content server 103 to request the selected course data (A1 in FIG. 4). The content server 103 transmits the requested course data to the game apparatus 101. That is, download of the course data is performed (A2 in FIG. 4). When the download is completed, the user can instantly play the course.

In the dedicated viewer, the list of courses prepared in advance (extracted on the server side) such as popularity ranking is presented to the user. Basically, the user refers to the presented list of courses, and selects a course the user is interested in. In addition, this dedicated viewer provides a very simple search (filtering) function. For example, a very simple search function is provided, with which the user is allowed to specify only one item among limited items, as a condition of filtering, such as filtering with "creator". A search function provided by the later-described web browser program allows the user to specify more detailed search conditions, in contrast to the dedicated viewer.

<2: Instant Route>

Figure 6:
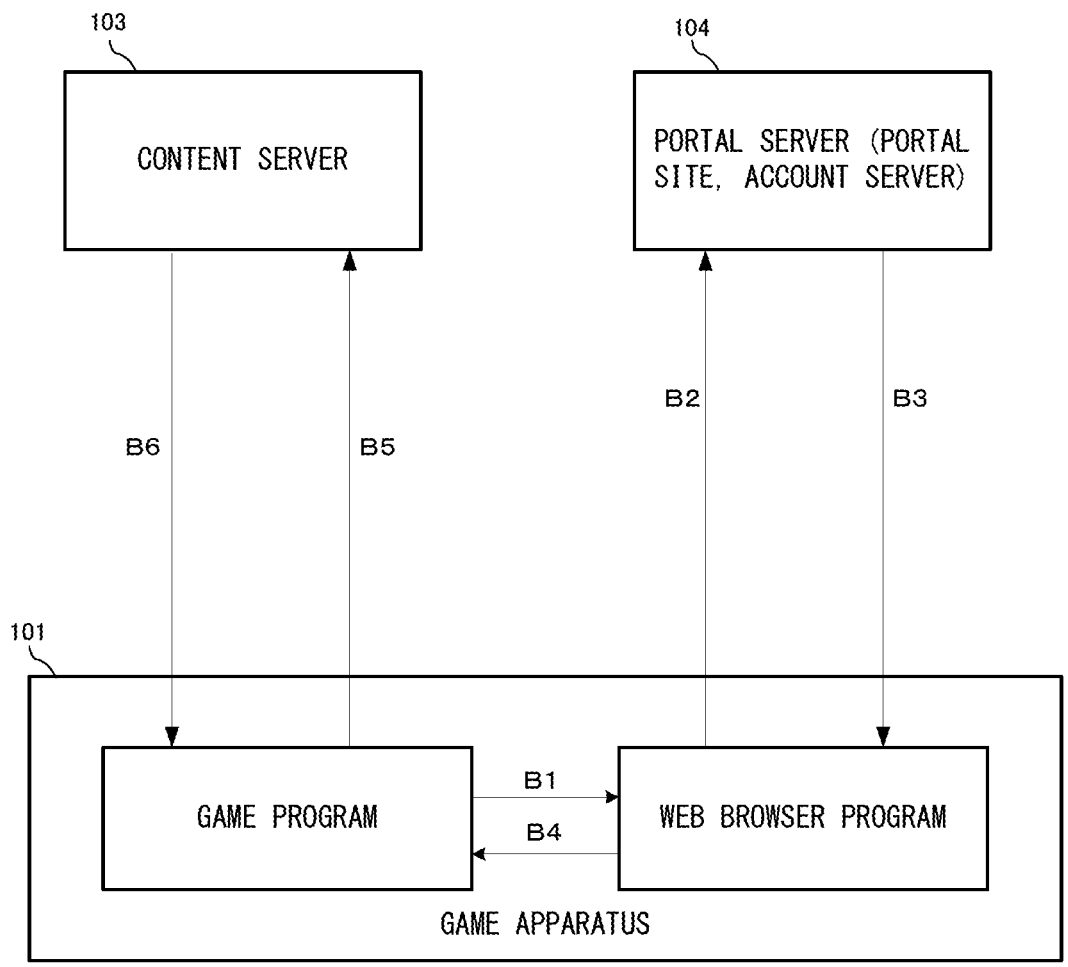
FIG. 6 is a schematic diagram showing a flow of download of course data in an instant route.

Next, instant download using a web browser on the game apparatus will be described. FIG. 6 is a schematic diagram showing a flow of course data download according to the instant route. In this mode, first, the user selects, for example, the item of "search with web browser" from the main menu of the game program. In response to this, the web browser program is activated, and the display screen is switched from the screen of the game process to the screen of the web browser process. Regarding the activation of the web browser, the web browser program is activated such that the web browser program is "called up" from the game program (B1 in FIG. 6). This call-up is performed in such a manner that a "return value" from the web browser program (web browser process) is requested. Hereinafter, activation by such call-up is referred to as "call-back activation (CB activation)". When the CB activation is performed, an argument is specified. As the argument, the URL of the portal site is specified. In the web browser process by the called web browser program, after this process is started, the URL indicated by the argument is automatically accessed (B2 in FIG. 6). As a result, web page data of the portal site is transmitted from the portal server 104 (B3 in FIG. 6), and the screen (top page) of the portal site is displayed. In the case of this route, entry of the member ID is not required for display of the portal site.

In the present embodiment, it is assumed that, for the portal site, two URLs, i.e., an open-to-public URL and a closed URL on the assumption that the CB activation is performed, are prepared. The URL to be specified as the argument when the CB activation is performed is the closed URL. The open-to-public URL is displayed as the search result of the search engine of the Internet, and is assumed to be accessed from the information processing terminal 102 such as a smartphone. Regardless of the URL with which the portal site is accessed, the content displayed as the portal site is basically the same. However, in terms of presence/absence of display of a later-described "immediately" button, there are some differences in display content between the page accessed by the open-to-public URL and the page accessed by the closed URL.

Figure 7:
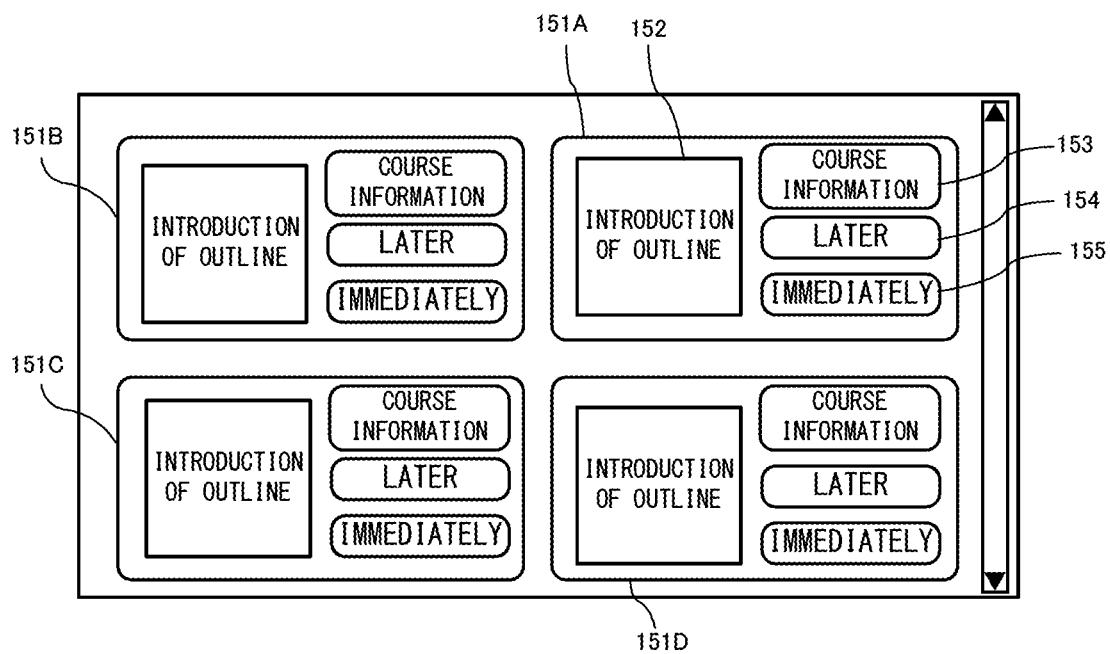
FIG. 7 shows a non-limiting example of a course list screen.
Figure 8:
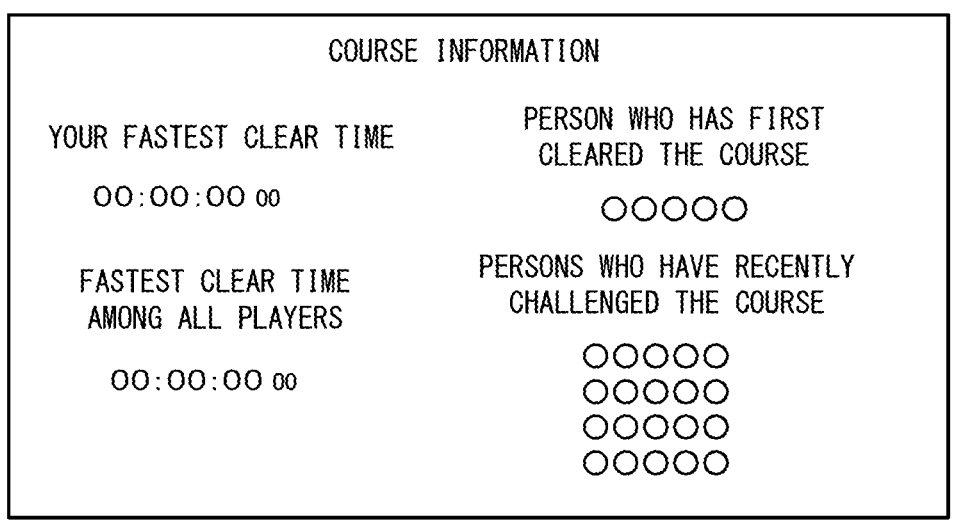
FIG. 8 shows a non-limiting example of a web page (screen) of "course information"

By performing a predetermined operation from the top page of the portal site, the user is allowed to perform course search with detailed search conditions being specified. For example, the user is allowed to perform course search using a plurality of search target items being combined by using AND/OR. As for the search target items, for example, content posting date, content creator, content difficulty, number of persons who have cleared each course, and the like are prepared in advance, and presented to the user. The user is allowed to select each item and enter a specific value for the item. For example, the user is allowed to perform search for a course by specifying, as search conditions, that the "creator" is "000", and that the difficulty of the course is "EASY", and that the number of persons who have cleared the course is "100 or less". FIG. 7 shows an example of a course list screen as a result of a predetermined search. In FIG. 7, information sections 151A to 151D of four courses are displayed on the screen. Each course information section 151 includes an area introducing the outline of the course, a "course information" button 153, a "later" button 154, and an "immediately" button 155. In the outline introducing area, sentences and/or images briefly introducing the course are displayed. When the user presses the "course information" button 153, the screen shifts to a web page showing the information relating to the course. FIG. 8 shows an example of the web page (screen) for the "course information". In this "course information", for example, the user's fastest clear time, the fastest clear time among persons who have played the course, a person who has first cleared the course, and persons who have recently challenged the course, are displayed as information. In addition, detailed information about the creator of the course, the specific structure of the course, and the like may be displayed, although not shown in the figure.

When the user presses the "later" button 154, download of the course is reserved. This will be described later. The "immediately" button 155 is a button on the assumption that the user wants to play the course immediately. That is, when the user presses the "immediately" button 155, download of the course is started, and the user can play the course as soon as the download is completed. The "immediately" button 155 is displayed only when the portal site is accessed with the closed URL based on the CB activation. When the portal site is accessed from the information processing terminal 102, this button is not displayed.

Referring back to FIG. 6, the outline of the flow after pressing of the "immediately" button 155 will be described. When any "immediately" button 155 displayed on the web page is clicked (selected), a predetermined URL character string (hereinafter referred to as first URL) associated with the button as a link destination of the button is obtained. This first URL is, for example, a character string such as "http://localhost/course ID" (a character string composed of loop back address+course ID). That is, although the character string of the first URL includes the character string corresponding to the selected course information, the first URL is not linked with other servers even if the character string thereof is clicked. Then, in the web browser process, thus obtained first URL is output, as the "return value", to (the game process executed by) the game program as the caller (B4 in FIG. 6). Thereafter, the web browser process shifts to the background, and the screen of the game apparatus 101 is switched to the screen of the game process.

In the game process as the caller, a process of acquiring the first URL and analyzing the first URL to generate a second URL is executed. The second URL is, for example, a download link of the course data in the content server 103 where the actual course data is stored. For example, the second URL is generated by, for example, replacing the character string of "localhost" in the first URL with a character string indicating the address of the content server 103. Then, in the game process, access to the content server 103 using the second URL is performed (B5 in FIG. 6). As a result, download of the course data corresponding to the second URL is performed (B6 in FIG. 6). When the download is completed, a play process using the course data is started. Thus, in the "instant route", the following process flow is seamlessly realized. That is, the web browser is directly called from the game process, and the user is allowed to perform course search, on the web browser, using the more detailed search conditions as compared to the case of the dedicated viewer, and then the user is allowed to instantly download the searched course and start to play the course.

Access to the content server 103 is performed through the dedicated network as described above. Therefore, even when the user knows the character string of the second URL and directly enters the character string by the web browser on the personal computer, the user cannot access the course data, thereby preventing the course data from being illegally downloaded.

In another embodiment, the information outputted as the return value to the game process side is not necessarily in the form of an URL such as the first URL. For example, only the course ID may be outputted as the return value. Then, on the game process side, a predetermined character string may be added to the course ID to generate the second URL.

<3: First "Later" Route>

Figure 10:
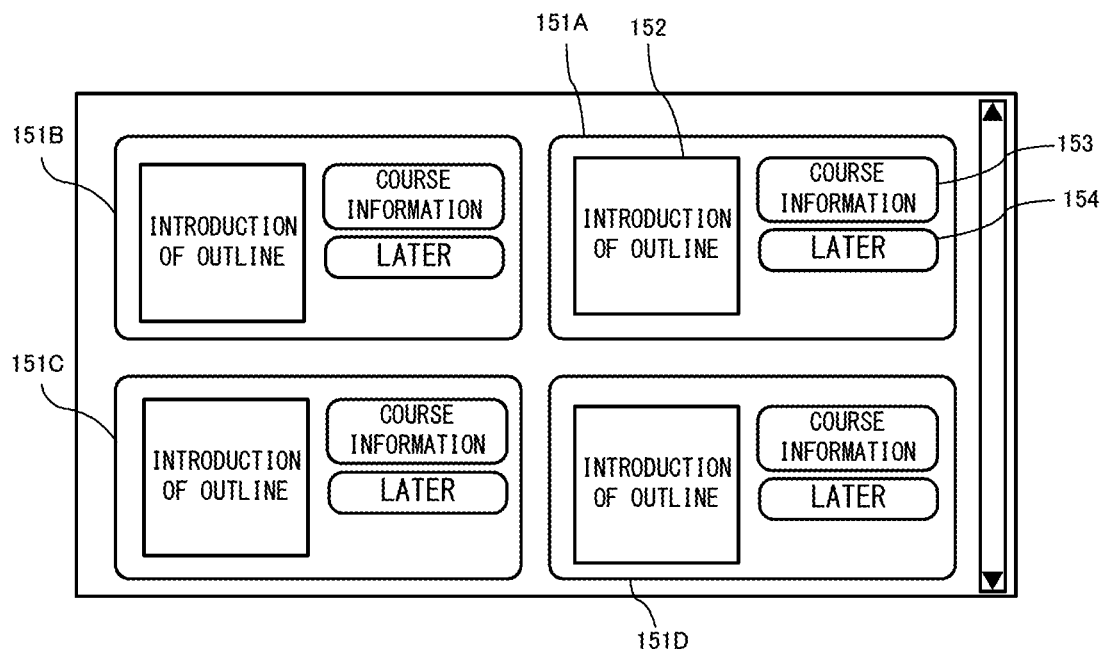
FIG. 10 shows a non-limiting example of a search result screen as a result of search with a smartphone.

Next, the first "later" route using the information processing terminal 102 such as a smartphone will be described. FIG. 9 is a schematic diagram showing a flow of the first "later" route, up to download. First, the user accesses the portal site by using a web browser on a smartphone, for example. The URL used at this time is the open-to-public URL described above (C1 in FIG. 9). When the portal site is accessed, first, a log-in process (e.g., display of a log-in screen) is requested by the portal server 104. In response to this request, the user enters his/her member ID or the like and transmits it to the portal server 104 (C2 in FIG. 9). When the log-in process is normally ended, web page data of the portal site is transmitted from the portal server 104 to the smartphone (C3 in FIG. 9). The top page of the portal site is displayed on the screen of the smartphone, and the user performs course search by performing a predetermined operation. Also in this search, more detailed search as compared to the search in the dedicated viewer mode can be realized as in the case of the "instant route". When a search instruction is transmitted to the portal server 104, a search process is executed in the portal server 104 in response to the instruction, and a web page as the result of the search is transmitted. FIG. 10 shows an example of a screen of the search result in the case where the search is performed with the smartphone. The screen configuration shown in FIG. 10 is identical to the screen configuration shown in FIG. 7 from which the "immediately" buttons 155 are eliminated. That is, when the portal site is accessed from the smartphone or the like, the web page in which the "immediately" buttons 155 are not displayed is transmitted from the portal server 104.

On the screen shown in FIG. 10, when the user performs a tap operation on the "later" button 154 of any course, the content of the operation is transmitted to the portal server 104 (C4 in FIG. 9). In response to this, the portal server 104 executes a process of associating the course ID of the course corresponding to the "later" button 154 on which the tap operation has been made, with the member ID which is currently in the log-in state, and storing these IDs in data called a "later" list (C5 in FIG. 9).

Thereafter, the user operates the game apparatus 101 to activate the game program, and selects, for example, an item of "browse 'later' list" from the main menu. In the game process relating to this game program, a process of accessing the portal server 104 in response to the user operation and acquiring the "later" list is performed (C6 in FIG. 9). At this time, the member ID stored in the game apparatus 101 is transmitted to the portal server 104, and the corresponding "later" list is searched for in the portal server 104 on the basis of the member ID, and transmitted. Therefore, the member ID with which the user logs in the portal site on the smartphone needs to be identical to the member ID stored in the game apparatus 101.

Figure 11:
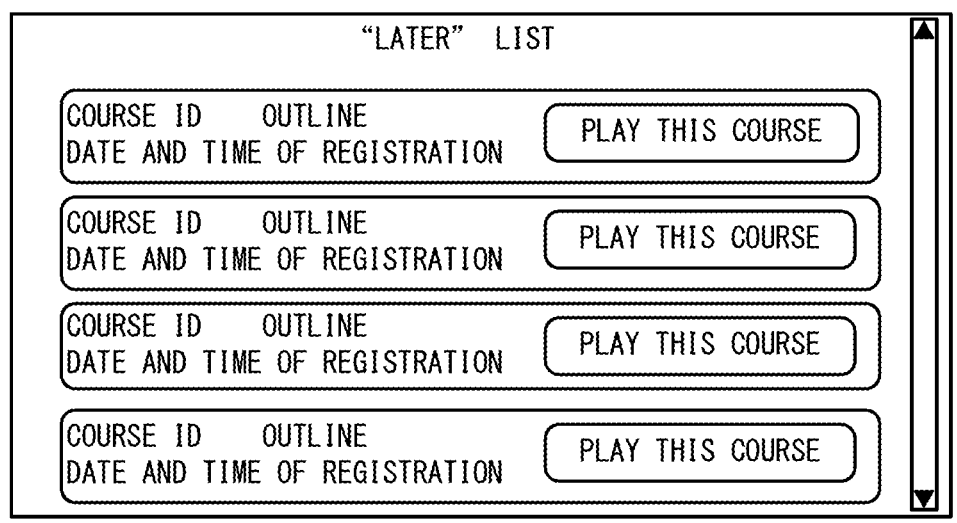
FIG. 11 shows a non-limiting example of a "later" list screen.

When the "later" list is acquired, an image based on the "later" list is displayed on the screen of the game apparatus 101. FIG. 11 shows an example of the screen of the "later" list. On this screen, information of a plurality of courses for which the user has registered download reservations by using the "later" button is displayed. When the user performs an operation to select any course on this screen, a download request for the selected course is made to the content server 103 (C7 in FIG. 9). For example, a character string of a download link such as the above-described second URL is generated based on the "later" list, and the content server 103 is accessed. Then, the selected course data is downloaded (C8 in FIG. 9). After the download is completed, a process for playing the course is started in the game process.

As described above, in the first "later" route, the user is allowed to search for course data by using a general-purpose terminal such as a smartphone, and register a reservation for later download of the course data.

<4: Second "Later" Route>

Next, the second "later" route will be described. FIG. 12 is a schematic diagram showing a flow of the second "later" route. This route is different from the first "later" route in that the terminal that accesses the portal site is not the information processing terminal 102 such as a smartphone, but (the web browser program) of the game apparatus 101. It is assumed that activation of the web browser program in this case is not the above-described CB activation from the game program, but activation of the web browser program by user operation performed from the main menu of the game apparatus 101 (such as a case where the web browser is solely activated). This case is identical to the case where the web browser is operated on a smartphone or the like. Therefore, the URL for the access to the portal site is the open-to-public URL. The flow of the process is basically identical to that in the case of the first "later" route. Therefore, description of the specific flow of the process will be omitted. However, regarding the log-in process in this second "later" route, the log-in process using the member ID or the like stored in the game apparatus 101 is performed (D2 in FIG. 12).

For reference purposes, a case where the web browser program is called by the CB activation and the "later" button 154 is pressed on the screen shown in FIG. 7 will be briefly described. That is, in the above-described "instant route", the "later" button 154 is pressed while both the "immediately" button 155 and the "later" button 154 are displayed. In this case, registration to the "later" list is performed using the member ID stored in the game apparatus 101. Thereafter, download using the "later" list is performed in the same manner as that in the first or second "later" route described above.

As described above, in the present embodiment, a part relating to the function of detailed search for course is not directly performed in the game process relating to execution of the game program, but is realized by the web browser, i.e., the web application. The reason is as follows. For example, it is conceivable that detailed search may be realized in the above-described dedicated viewer. However, in the field of development of the game program (native application) for the game apparatus as described above, it is difficult in many cases to incorporate the detailed search function as described above in the game program in the development stage, because of the trade-off between the development period (such as date of release of products) and the priorities of functions to be realized. In addition, regarding the data having high "posted content" property, that is, data created and posted by the user, like the above-described course data, it can be said that such data may have high frequency of addition/update even after release of the game. Further, in the case where it is expected that a large amount of such data will be distributed after release of the game, there may be a demand to improve the convenience for the user by facilitating search for the data by adding a new function to the data search function. On the other hand, in the case where the released game program is updated to add a new function or the like, it may be difficult to realize speedy update when complexity of the content to be changed, the operational verification thereof, and the like are considered. Taking the above factors into consideration, in the present embodiment, regarding the data having high "posted content" property and high frequency of addition/update, and obtained through data exchange with a predetermined server, the search function to search for this data is realized as a web application. The reason is as follows. When the search function is a web application, the development load required for addition/update of the search function can be reduced as compared to that in the development of the game program for the game apparatus. Thus, the development load in the stage of developing the game program (native application) can be reduced, and an environment to speedily respond to user's needs after release of the game can be provided. For example, even after release of the game, it is possible to provide a new method for searching for the course data or the like, such as adding a new item that can be used (selected) as a search condition. For example, in the case where an item of a search condition such as "course in which a specific enemy character appears", which is not provided when the game is released, is required to be added after release of the game, the above-described system can meet such demand.

Further, in the download/play of the course data as described above, the downloaded course data is basically treated as temporary data. That is, the downloaded course data is data to be temporarily used (data highly likely to be disposable). For example, after the game program is ended, if the user wants to play the same course again, the user needs to download the course data again (it is conceivable to eliminate the trouble of search by using a favorite function). In other words, the downloaded course data is different in nature from: updated data corresponding to so-called "patch"; data which is downloaded as additional data when the game process is activated and is reflected in the game data before start of the main part of the game; and downloaded and added content such as additional scenario (data required to be reflected in the game data by (re)start of the game after download). Regarding search and acquisition of the data which is highly likely to be a temporal content, the system according to the present embodiment is advantageous in reducing the development load and improving the convenience for the user.

The information processing according to the present embodiment will be described in more detail.

Figure 13:
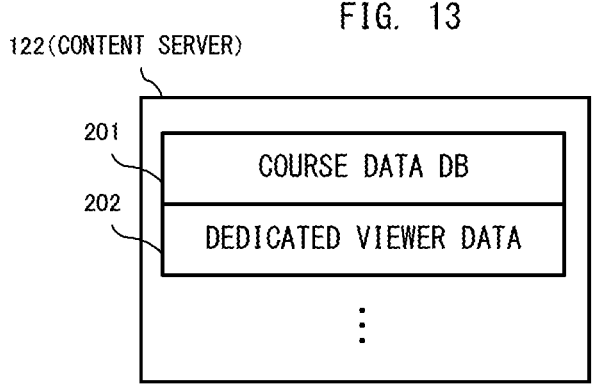
FIG. 13 is a diagram showing main data stored in an internal storage device 122 of the content server 103.

First, with reference to FIGS. 13 to 22, main data used in the present embodiment will be described. FIG. 13 is a diagram showing main data stored in the internal storage device 122 of the content server 103. In the internal storage device 122 of the content server 103, course data DB (Data Base) 201, dedicated viewer data 202, and the like are stored. The course data DB 201 is a database in which course data created by a user as described above is stored. For example, a course ID for identifying a course, course data as the entity of the course, bibliographic information relating to the course, and the like are associated with each other and stored in the database. The dedicated viewer data 202 is data to be a base of the content displayed in the dedicated viewer. For example, the dedicated viewer data 202 is data indicating "popularity ranking" or the like.

Figure 14:
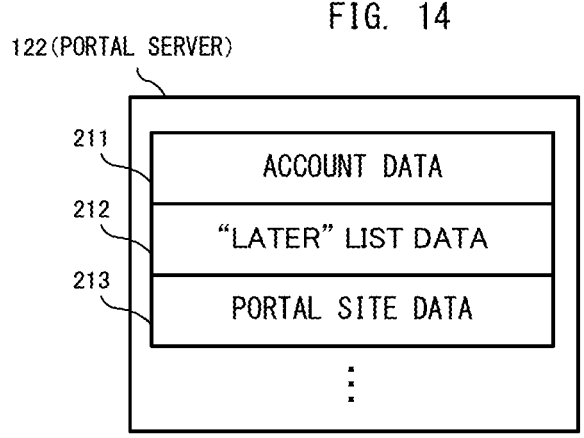
FIG. 14 is a diagram showing main data stored in an internal storage device 122 of the portal server 104.

FIG. 14 is a diagram showing main data stored in the internal storage device 122 of the portal server 104. In the internal storage device 122 of the portal server 104, account data 211, "later" list data 212, portal site data 213, and the like are stored. The account data 211 is data of accounts such as the member ID, password, and the like. The "later" list data 212 is data of the above-described "later" list. For example, the member ID and at least one course ID are associated with each other and stored. The portal site data 213 is data constituting the above-described portal site. In other words, the portal site data 213 includes various data for creating web page data to be transmitted to the game apparatus 101 and the information processing terminal 102.

Figure 15:
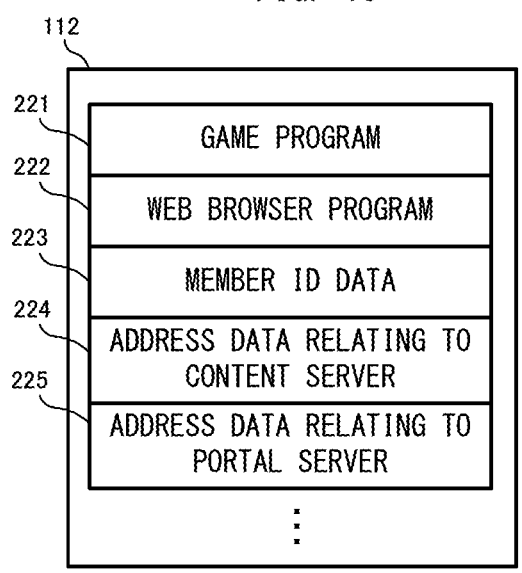
FIG. 15 is a diagram showing data stored in an internal storage device 112 of the game apparatus 101.

FIG. 15 is a diagram showing data stored in the internal storage device 112 of the game apparatus 101. In the internal storage device 112 of the game apparatus 101, the game program 221, the web browser program 222, member ID data 223, address data 224 relating to the content server, address data 225 relating to the portal server, and the like are stored. These programs and data are copied in the main memory 113 and used, according to need. The game program 221 is a program for implementing the above-described game process. The web browser program 222 is a program for implementing the web browser function (web browser process) of the game apparatus 101 as described above. The member ID data 223 is the member ID and the password of the above-described portal site. For example, when the game apparatus 101 is initially started up, the user is requested to enter the member ID and the password, and the entered content is stored as the member ID data 223. The address data 224 relating to the content server is address information required for access to the content server 103. The address data 225 relating to the portal server is address information (the open-to-public URL, the closed URL, and the like of the portal site) required for access to the portal server 104. In addition, for example, operation data indicating the content of user operation is also generated as appropriate, and stored in the main memory 113.

Also in the internal storage device of the information processing terminal 102, a predetermined web browser program and the like are stored as appropriate, although not shown in the figure.

Figure 16:
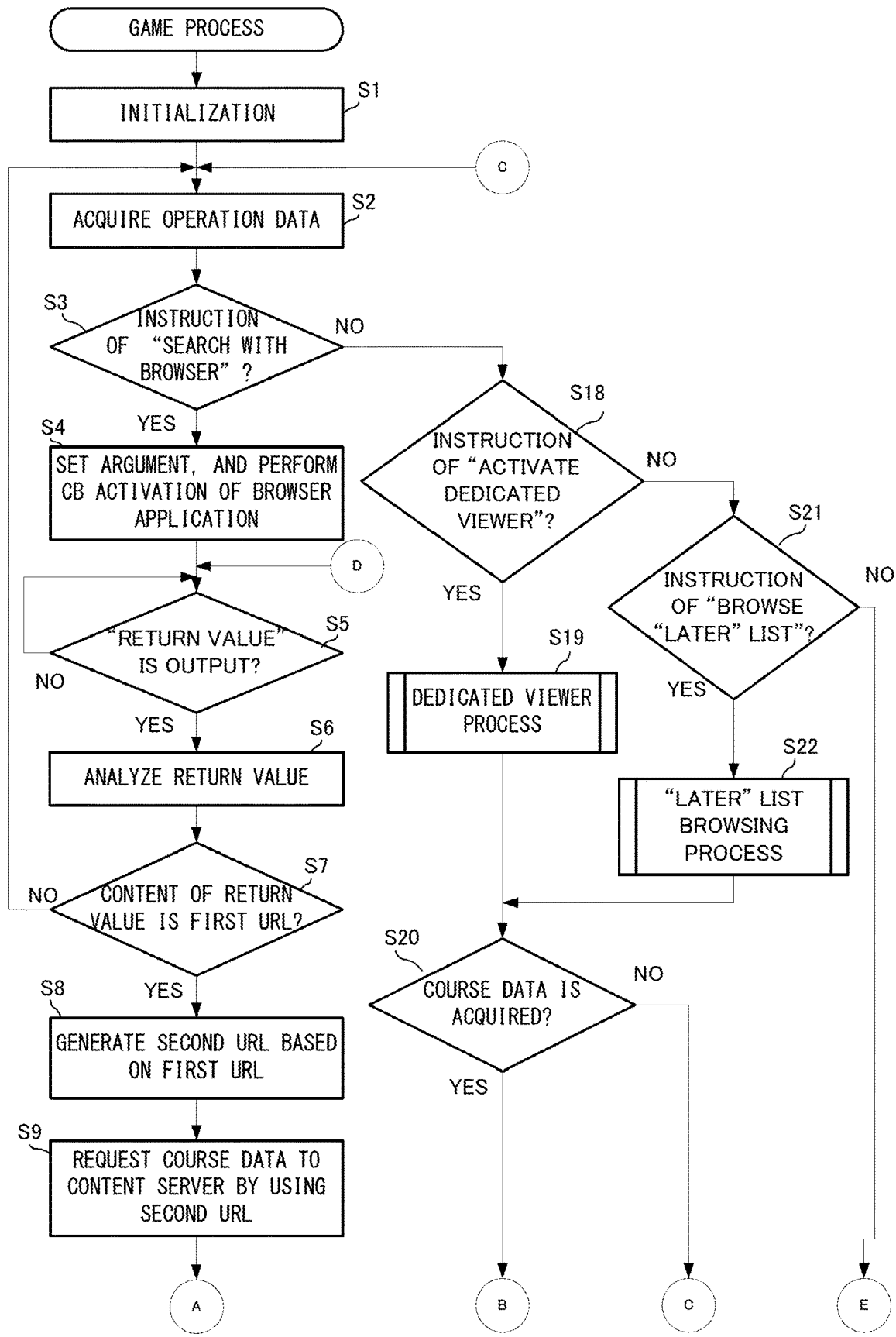
FIG. 16 is a flowchart showing a process executed by a game program 221 in detail.
Figure 17:
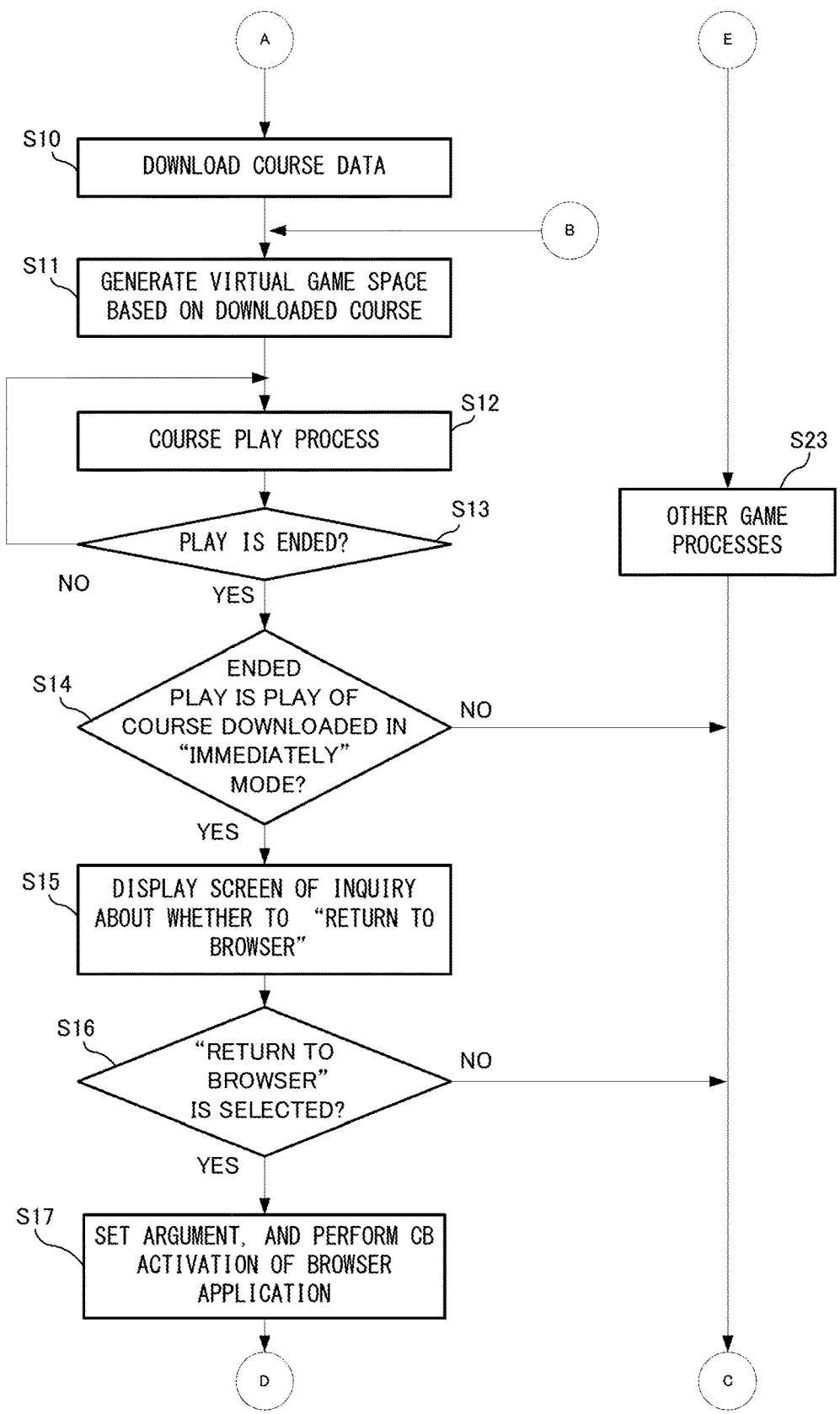
FIG. 17 is a flowchart showing a process executed by the game program 221 in detail.

Next, the game process executed by the game program 221 will be described in detail with reference to FIG. 16. FIGS. 16 and 17 are flowcharts showing the process executed by the game program 221 in detail. When the game program 221 is activated, first, the processor section 111 performs an initialization process, whereby initialization of various data is executed (S1). Next, the processor section 111 acquires the operation data (S2). Next, the processor section 111 determines whether or not the operation content indicated by the operation data is an instruction to activate the web browser (S3). For example, this is the case where the item of "search with web browser" is selected from the main menu. When the result of the determination is that the operation content is an instruction to activate the web browser (YES in S3; this case basically corresponds to the mode of the "instant route" described above). The processor section 111 acquires the closed URL of the portal site from the address data 225 relating to the second server. Then, the processor section 111 sets the closed URL as an argument, and activates the web browser program 222 in accordance with the above-described CB activation (S4). Thereafter, the processor section 111 also executes a process of shifting the game process relating to the game program to the background temporarily (as the result, the screen displayed on the game apparatus 101 is switched from the screen of the game process to the screen of the web browser).

Next, the processor section 111 executes (as a background process) a process of monitoring whether or not a "return value" is output from the web browser process relating to execution of the web browser program 222 (S5). In another embodiment, the processor section 111 may execute a process of monitoring whether or not the web browser process shifts to the background, instead of monitoring the return value.

When it is detected that the "return value" is returned (YES in S5), the processor section 111 restores the process relating to the game program to the foreground, and executes a process of analyzing the content of the return value (S6).

Next, the processor section 111 determines whether or not the content of the return value is the first URL as described above (S7). In the present embodiment, it is assumed that, in browsing the portal site by the web browser, if the user ends the web browser without selecting the "immediately" button 155 (e.g., if the user has just specified "later"), a return value indicating this effect (a value different from the first URL, e.g., a NULL value) is set as the return value. When the result of the determination is that the return value is not the first URL (NO in S7), the processor section 111 returns to the process in S2. On the other hand, when the return value is the first URL (YES in S7), the processor section 111 executes a process of generating the second URL on the basis of the first URL (S8). For example, this process is replacing the character string of "localhost" with the address of the content server 103.

Next, the processor section 111 executes a process of accessing the content server 103 by using the second URL, and requesting course data (S9). When transmission of the corresponding course data from the content server 103 is started, the processor section 111 executes a process of downloading the course data (S10 in FIG. 17). If course data downloaded in advance of step S10 remains in the main memory 113 or the like, the course data may be erased at this timing. At this time, the processor section 111 generates a screen showing the progress of the download and displays the screen, as appropriate.

When the download is completed, the processor section 111 expands the downloaded course data on the main memory 113, and generates a virtual game space on the basis of the course data (S11). Then, a play screen for this course is displayed, and a process for playing the course is executed (S12). That is, a game process relating to the course, such as moving a player character on the basis of the operation data, is executed as appropriate.

Next, the processor section 111 determines whether or not the play of the course is ended (S13). For example, whether the play of the course is ended is determined depending on whether the user has cleared the course, or whether the user has failed to clear the course (e.g., a situation that the number of remaining player characters becomes zero), or whether a definitive instruction to end the play is received from the user. If the result of the determination is that the play is not yet ended (NO in S13), the processor section 111 returns to the process in S12, and the process of playing the course is continued. On the other hand, if the result of the determination is that the play is ended (YES in S13), the processor section 111 determines whether or not the course that has just been played is the course downloaded in the "immediately" mode (S14). Any determination method may be adopted. For example, a flag indicating play of course data based on a return value obtained by CB activation is prepared. Then, the flag is set to be turned on at the timing to generate the second URL on the basis of the first URL, and the above determination is performed on the basis of the flag.

When the result of the determination is that the course that has just been played is not the course downloaded in the "immediately" mode (NO in S14), the processor section 111 returns to the process in S2. On the other hand, when the course that has just been played is the course downloaded in the "immediately" mode (YES in S14), the following process is executed. That is, when the course downloaded in the "immediately" mode has been played, an inquiry about whether or not to "return to the browser" is made when the play is ended. When the user selects "return to the browser", the web browser is activated, and access to the portal site is performed, and a web page showing information relating to the just played course is displayed. More specifically, first, the processor section 111 displays a screen for inquiring whether or not to "return to the browser" (S15). Next, the processor section 111 determines, on the basis of the operation data, whether or not the user has selected "return to the browser" in response to the inquiry (S16). When "return to the browser" has not been selected (NO in S16), the processor section 111 returns to the process in S2. On the other hand, when "return to the browser" has been selected (YES in S16), the processor section 111 executes a process of activating the web browser program 222 by CB activation (S17). This process is basically identical to the process in S4 except the value specified as the argument. Specifically, the argument specified in step S17 is the URL of the web page showing the course information (refer to FIG. 8) of the just played course. Thereafter, the processor section 111 returns to the process in S5. By performing the above process when the play is ended, it is possible to particularly improve the convenience for the user in the above-described "instant route" mode.

Next, a description will be given of the case where the result of the determination in S3 in FIG. 16 is that the operation content indicated by the operation data is not an instruction to activate the web browser (NO in S3). In this case, the processor section 111 determines whether or not the operation content indicated by the operation data is an instruction to "activate the dedicated viewer" (S18). For example, this case is when the item of "dedicated viewer" is selected from the main menu. When the result of the determination is that the operation content is an instruction to "activate the dedicated viewer" (YES in S18), the processor section 111 executes a dedicated viewer process (S19). This flow corresponds to the above-described "dedicated viewer route" mode.

Figure 18:
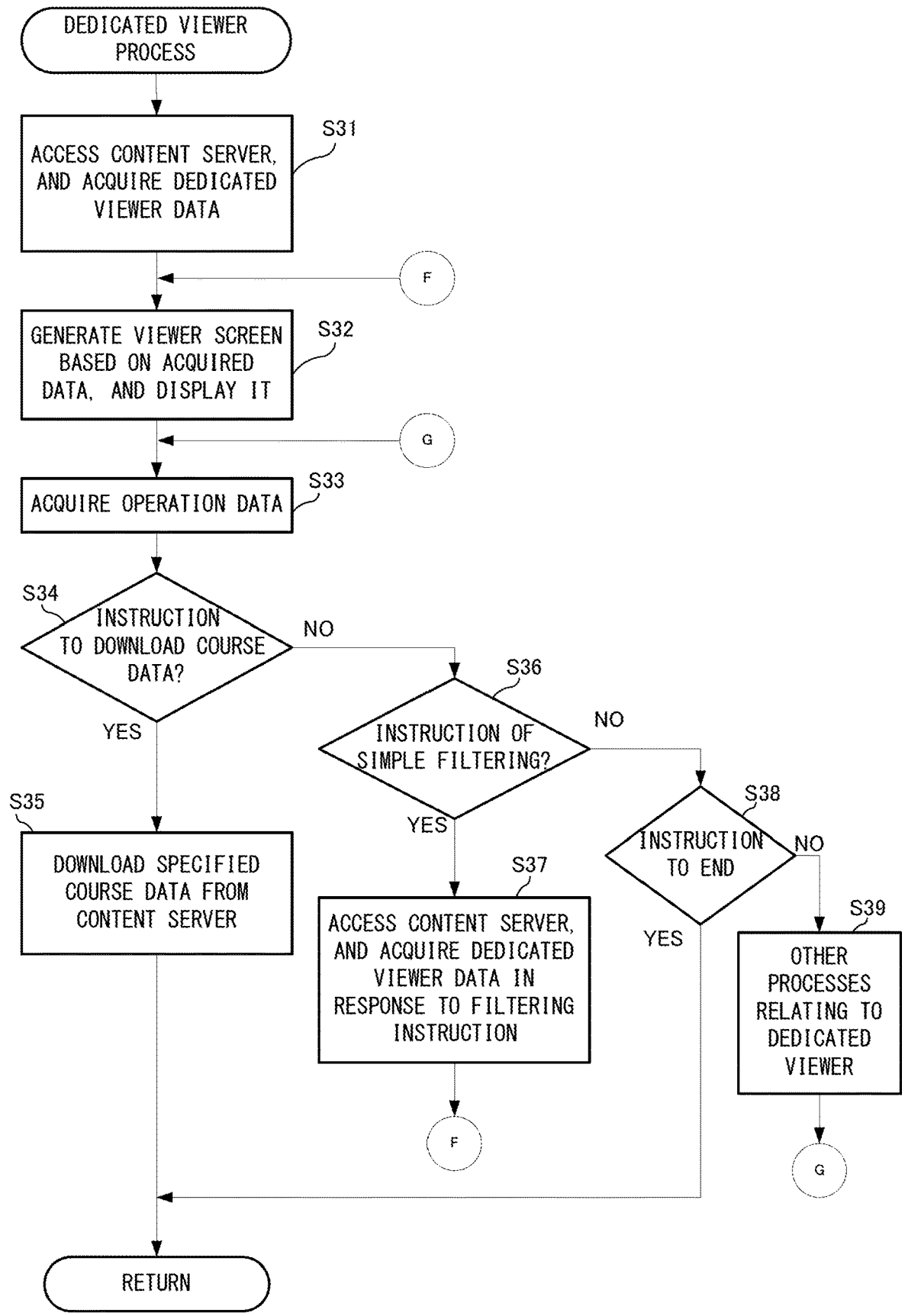
FIG. 18 is a flowchart showing a dedicated viewer process in detail.

FIG. 18 is a flowchart showing the dedicated viewer process according to S19 in detail. First, the processor section 111 accesses the content server 103, and requests data for the dedicated viewer. In response to the request, the data for the dedicated viewer is transmitted from the content server 103, and the processor section 111 acquires (receives) the data (S31).

Next, on the basis of the acquired data for the dedicated viewer, the processor section 111 generates a dedicated viewer screen, and displays the screen on the display section 116 (S32).

Next, the processor section 111 acquires the operation data (S33), and determines whether or not the operation content is an instruction to download the course data (S34). When the operation content is an instruction to download the course data (YES in S34), the processor section 111 generates, for example, the second URL on the basis of the operation content, thereby generating a request for the course data to the content server 103. Then, the processor section 111 accesses the content server 103, and executes the process of downloading the course data specified by the operation content (S35). When the download is completed, the dedicated viewer process is ended.

On the other hand, when the result of the determination in S34 is that the operation content is not an instruction to download the course data (NO in S34), the processor section 111 determines whether or not the operation content is an instruction of very simple search as described above (S36). For example, this is an instruction of simple filtering, such as a request for display of courses created by a certain "creator". When such an instruction is issued (YES in S36), the processor section 111 transmits, to the content server 103, a request including the content of the filtering instruction. Then, the processor section 111 performs a process of acquiring the data for the dedicated viewer which is transmitted from the content server 103 in response to the above request (S37). Thereafter, the processor section 111 returns to the process in S32. As a result, a dedicated viewer screen in accordance with the filtering instruction is created and displayed.

On the other hand, when the result of the determination in S36 is that the instruction is not an instruction for the simple search (NO in S36), the processor section 111 determines whether or not the operation content is an instruction to end the dedicated viewer (S38). When the result of the determination is that the operation content is an instruction to end (YES in S38), the processor section 111 ends the dedicated viewer process. On the other hand, when the operation content is not an instruction to end (NO in S38), the processor section 111 executes another process (process relating to the dedicated viewer) in accordance with the operation content (S39). Then, the processor section 111 returns to the process in S33. This is the end of the description of the dedicated viewer process.

Referring back to FIG. 16, when the dedicated viewer process is ended, the processor section 111 determines whether or not any course data has been acquired (downloaded) by the dedicated viewer process (or by the later-described "later" list browsing process) (S20). For example, a flag indicating that new course data is downloaded is prepared, and the determination may be performed using this flag. For example, this flag may be turned on at the timing when download of course data is executed in the dedicated viewer process (and the later-described "later" list browsing process). When the result of the determination is that course data has been acquired (YES in S20), the processor section 111 proceeds to the process in S11. On the other hand, when no course data has been acquired (NO in S20), the processor section 111 returns to the process in S2.

Next, a description will be given of the case where the result of the determination in S18 is that the operation content indicated by the operation data is not an instruction to "activate the dedicated viewer" (NO in S18). In this case, the processor section 111 determines whether or not the operation content indicated by the operation data is an instruction to browse the "later" list (S21). For example, this is the case where the item of "browse 'later' list" is selected from the main menu. When the result of the determination is that the operation content is not an instruction to browse the "later" list (NO in S21), the processor section 111 executes another game process based on the operation data (S23 in FIG. 17). On the other hand, when the operation content is an instruction to browse the "later" list (YES in S21), the processor section 111 executes the "later" list browsing process (S22).

Figure 19:
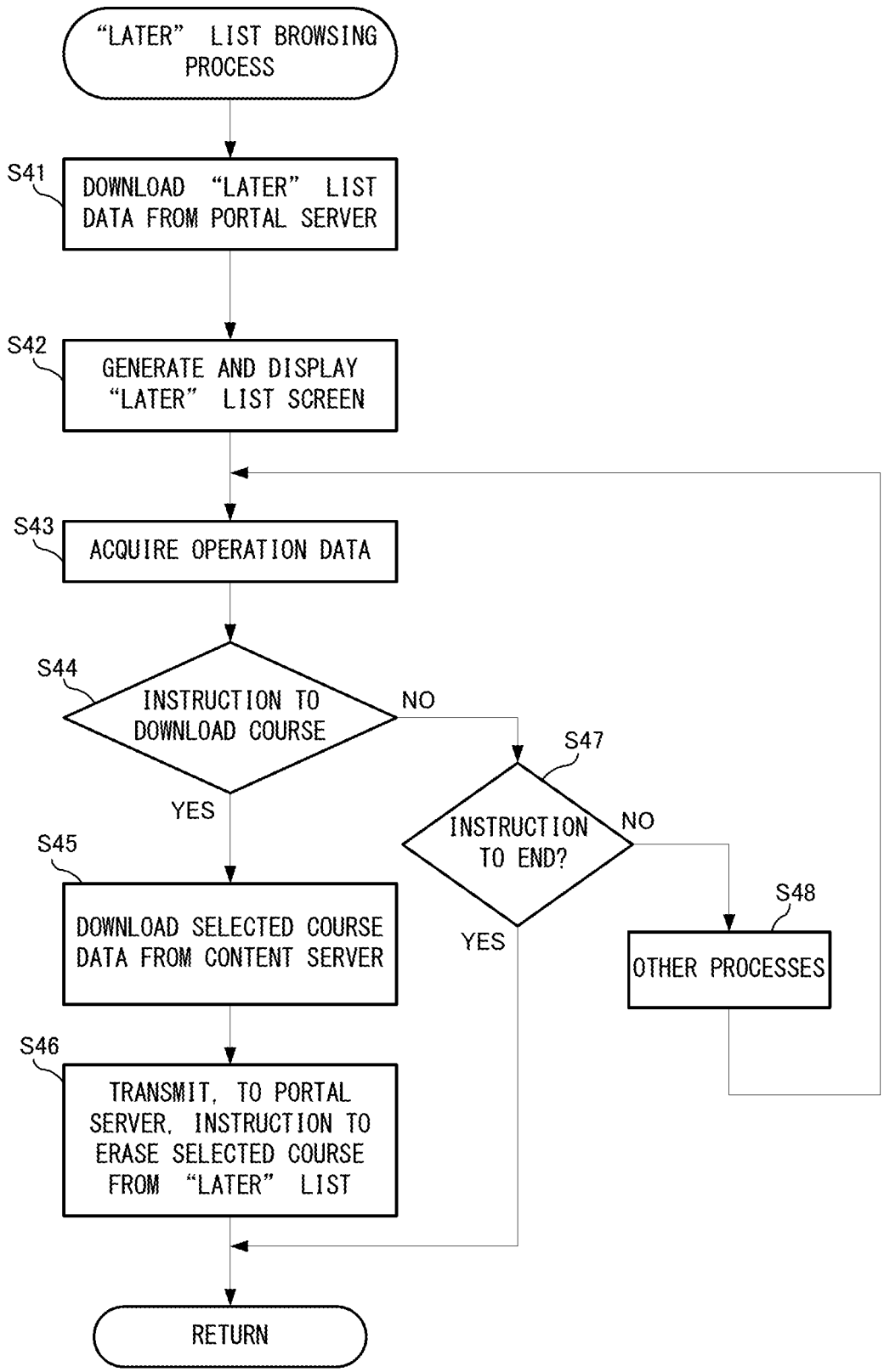
FIG. 19 is a flowchart showing a "later" list viewing process in detail.

FIG. 19 is a flowchart showing the "later" list browsing process in detail. In FIG. 19, first, the processor section 111 executes a process of acquiring the "later" list from the portal server 104 (S41). Specifically, the processor section 111 first acquires the member ID data 223 from the internal storage device 112. Then, the processor section 111 transmits, to the portal server 104, a request to transmit "later" list data, together with the member ID data 223. Since the "later" list data corresponding to the member ID data 223 is transmitted from the portal server 104, the processor section 111 executes acquisition of the "later" list by receiving the "later" list data.

Next, on the basis of the acquired "later" list data, the processor section 111 generates a screen for displaying the "later" list as shown in FIG. 11, and displays the screen on the display section 116 (S42).

Next, the processor section 111 acquires operation data (S43). Then, the processor section 111 determines whether or not the operation content thereof is an instruction to download any one of the courses registered on the "later" list (S44). When the result of the determination is that the operation content is an instruction to download (YES in S44), the processor section 111 executes a process of downloading data of the selected course from the content server 103 (S45). Specifically, on the basis of the operation data, the processor section 111 specifies the course selected from the "later" list, and identifies the course ID. Then, the processor section 111 generates a course data transmission request corresponding to the course ID, and transmits the request to the content server 103. In response to the request, the content server 103 transmits the course data, and the processor section 111 receives the course data.

Next, the processor section 111 generates an instruction to erase the downloaded course from the "later" list, and transmits the instruction to the portal server 104 (S46). In another embodiment, the process of transmitting this erasing instruction may not be executed. For example, this process is not necessarily performed in the case where the user manually edits the "later" list.

Next, when the result of the determination in S44 is that the operation content is not an instruction to download (NO in S44), the processor section 111 determines whether or not the operation content is an instruction to end the "later" list browsing process (S47). When the result of the determination is that the operation content is not an instruction to end (NO in S47), the processor section 111 executes another process based on the operation content (S48). Thereafter, the processor section 111 returns to the process in S43. On the other hand, when the operation content is an instruction to end (YES in S47), the processor section 111 ends the "later" list browsing process.

Referring back to FIG. 16, when the "later" list browsing process is ended, the process in S20 is executed. That is, the process of determining whether or not any course data is acquired (downloaded) by the dedicated viewer process or the "later" list browsing process is executed. Then, according to the result of the determination, the above-described processes are executed.

This is the end of the description of the game process executed by the game program 221.

Figure 20:
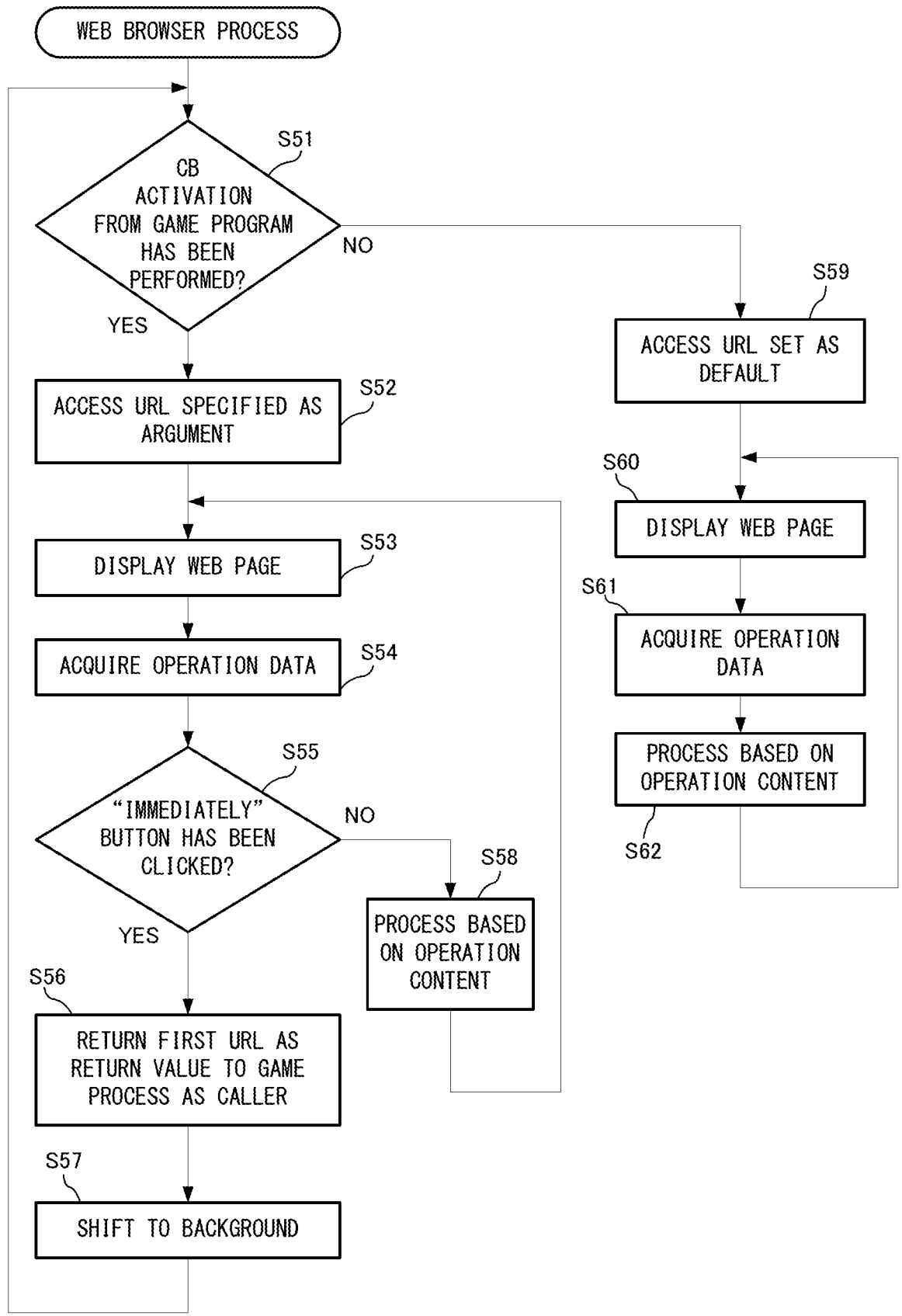
FIG. 20 is a flowchart showing a web browser process in detail.

Next, the web browser process implemented by execution of the web browser program 222 will be described in detail with reference to FIG. 20. FIG. 20 is a flowchart showing the web browser process in detail. Upon receiving an instruction to activate the web browser, the processor section 111 executes a predetermined initialization process, and then determines whether or not the CB activation from (the game process by) the game program 221 has been performed (S51). When the result of the determination is that the CB activation has been performed (YES in S51), the processor section 111 accesses the portal server 104 by using the URL given as the argument at the time of the CB activation (S52). For example, web page data such as the top page of the portal site is transmitted from the portal server 104. The processor section 111 receives the web page data, generates (renders) a web page based on the web page data, and displays the web page on the display section 116 (S53).

Next, the processor section 111 acquires operation data (S54), and determines whether or not the operation content thereof is an operation to select the "immediately" button 155 as described above (S55). When the result of the determination is that the operation content is not an operation to select the "immediately" button 155 (NO in S55), the processor section 111 executes another process based on the operation content as appropriate (S58). For example, if the operation content is an operation to specify detailed search conditions and perform search, a process of transmitting the search conditions to the second server and acquiring a web page as a result of the search is executed.

On the other hand, when the operation content is an operation to select the "immediately" button 155 (YES in S55), the processor section 111 acquires the above-described first URL corresponding to the selected "immediately" button 155. Then, the processor section 111 performs a process of setting the first URL as the "return value" of the CB activation, and outputting the first URL to the game process as the caller (S56). Thereafter, the processor section 111 executes a process of shifting the web browser process to the background (S57).

On the other hand, when the result of the determination in S51 is that the CB activation has not been performed (NO in S51), the processor section 111 accesses a predetermined URL that is set in advance as a default value, for example (S59), and displays a web page relating to the URL (S60). Next, the processor section 111 acquires operation data (S61), and executes a predetermined process based on the operation content indicated by the operation data (S62). Thereafter, the processor section 111 returns to the process in S60. That is, in this case, a general web browsing process is executed. This is the end of the description of the web browser process executed by the web browser program.

Figure 21:
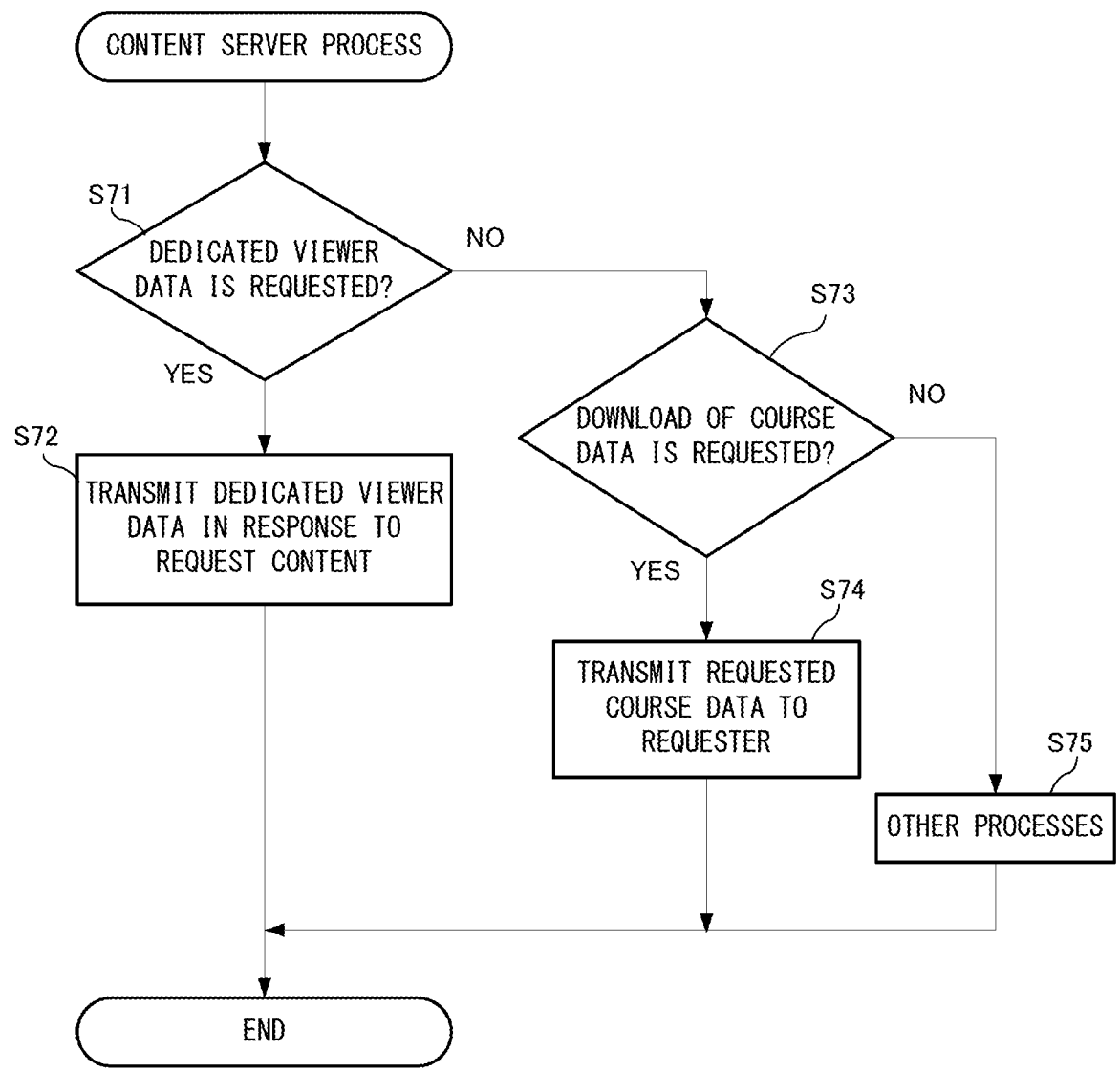
FIG. 21 is a flowchart showing a process executed in the content server 103 in detail.

Next, a process executed in the content server 103 will be described in detail. FIG. 21 is a flowchart showing the process executed in the content server 103 in detail. The process shown by the flowchart is repeatedly executed at a predetermined cycle. First, the processor section 121 of the content server 103 determines whether or not a request to transmit the dedicated viewer data is received from the game apparatus 101 (S71). When the request for the dedicated viewer data is received (YES in S71), the processor section 121 of the content server 103 acquires necessary data from the dedicated viewer data 202, and transmits the data to the game apparatus 101 (to the game program 221) as a requester terminal (S72).

On the other hand, when the result of the determination in S71 is that a request to transmit the dedicated viewer data is not received from the game apparatus 101 (NO in S71), the processor section 121 of the content server 103 determines whether or not a request to download course data is received from the game apparatus 101 (S73). When the result of the determination is that a request to download course data is received (YES in S73), the processor section 121 of the content server 103 acquires the course data specified by the request from the course data DB 201, and transmits the course data to the game apparatus 101 as a requester terminal (S74).

On the other hand, when the result of the determination in S73 is that a request to download course data is not received (NO in S73), the processor section 121 of the content server 103 executes another process as appropriate (S75). This is the end of the description of the process executed in the content server 103.

Figure 22:
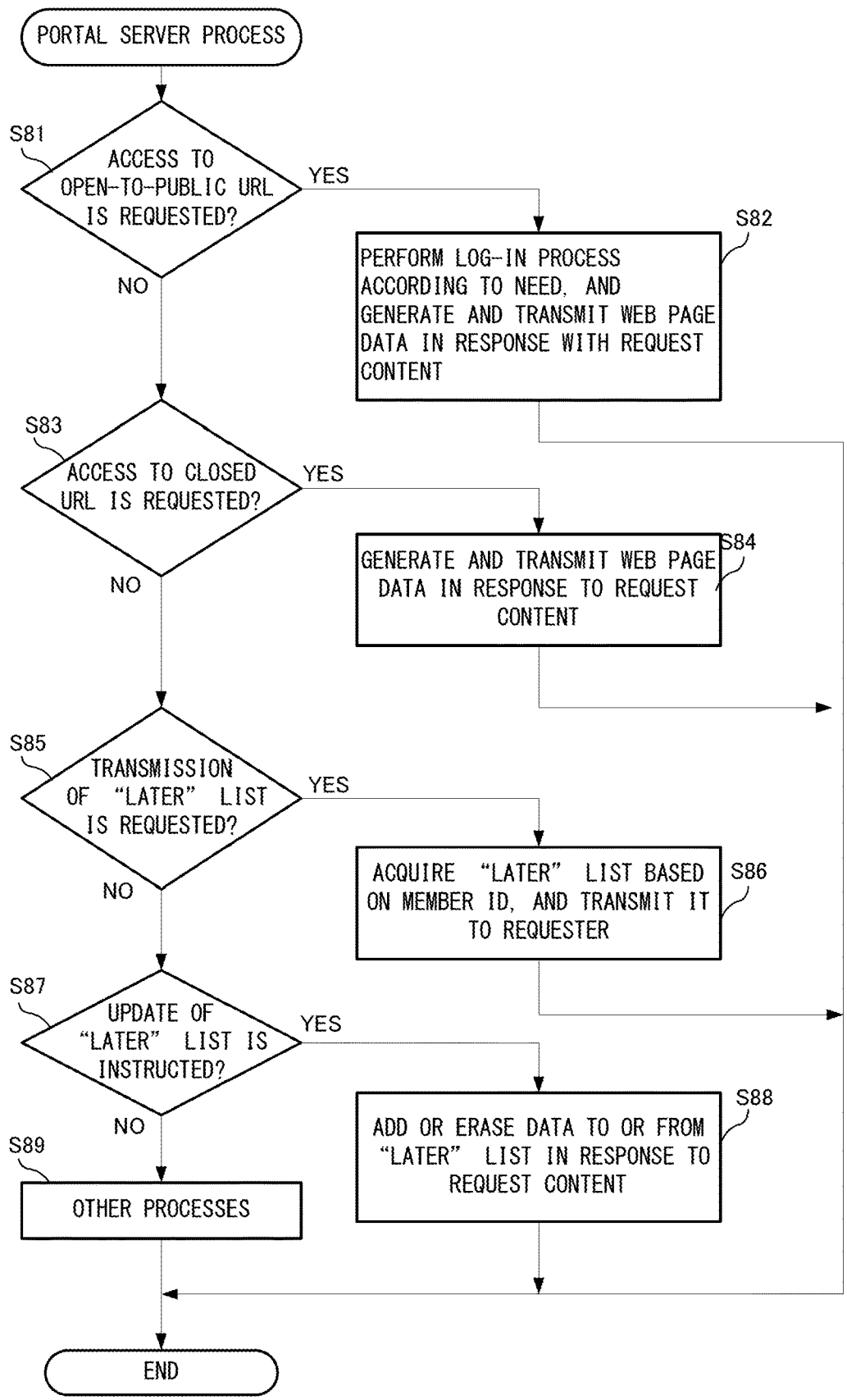
FIG. 22 is a flowchart showing a process executed in the portal server 104 in detail.

Next, a process executed in the portal server 104 will be described in detail. FIG. 22 is a flowchart showing the process executed in the portal server 104 in detail. The process shown by this flowchart is also repeatedly executed at a predetermined cycle.

With reference to FIG. 22, first, the processor section 121 of the portal server 104 determines whether or not there is an access request to the open-to-public URL of the portal site (S81). When the result of the determination is that there is an access request to the open-to-public URL (YES in S81), the processor section 121 of the portal server 104 executes, according to need, a log-in process with a terminal that has made the request. Then, the processor section 121 of the portal server 104 generates web page data according to the request content, and transmits the web page data to the requester terminal (S82). The web page data thus generated is data of a web page which does not include the "immediately" button 155.

On the other hand, when the result of the determination in S81 is that there is no access request to the open-to-public URL (NO in S81), the processor section 121 of the portal server 104 determines whether or not there is an access request to the closed URL of the portal site (S83). That is, the processor section 121 of the portal server 104 determines presence/absence of an access from the web browser process (game apparatus 101) at the time when the CB activation is performed. When the result of the determination is that there is an access request to the closed URL (YES in S83), the processor section 121 of the portal server 104 generates web page data according to the request content, and transmits the web page data to the requester terminal (S84). The web page data thus generated is data of a web page including the "immediately" button 155.

In another embodiment, in advance of the process in S84, a process of determining a so-called "user agent" of the requester terminal (browser) may be executed. In the present embodiment, it is assumed that only the game apparatus 101 accesses the closed URL, basically. However, assuming the case where the character string of the closed URL is directly input through a browser on a smartphone or a PC, whether or not the accessing terminal (browser) is the game apparatus 101 may be determined by using the user agent. If the access is from a smartphone or a PC, a process of redirecting to the open-to-public URL may be performed.

On the other hand, when the result of the determination in S83 is that there is no access request to the closed URL (NO in S83), the processor section 121 of the portal server 104 determines whether or not there is a request to transmit the "later" list (S85). When the result of the determination is that there is a request to transmit the "later" list (YES in S85), the processor section 121 of the portal server 104, based on the member ID included in the request, searches and acquires the corresponding "later" list data 212, and transmits the "later" list data 212 to the game apparatus 101 as a requester terminal (S86).

On the other hand, when the result of the determination in S85 is that there is not request to transmit the "later" list (NO in S85), the processor section 121 of the portal server 104 determines whether or not there is an instruction to update the "later" list (S87). This is the case where the "later" button 154 is clicked on a smartphone or the like to add a course to the list, or where a downloaded course is erased from the "later" list. When the result of the determination is that there is an instruction to update the "later" list (YES in S87), the processor section 121 of the portal server 104, based on the instruction content, performs addition or erasing of data to or from the "later" list (S88).

On the other hand, when the result of the determination in S87 is that there is no instruction to update the "later" list (NO in S87), the processor section 121 of the portal server 104 executes another process as appropriate (89). This is the end of the description of the process executed in the second server.

As described above, according to the present embodiment, among a plurality of functions realized by a game process, a function that requires data exchange with a predetermined server (in the present embodiment, search for course data) is realized as a web application operating on the web. In other words, among the plurality of functions realized by the game process, a part relating to the course data search function is realized as a web application. Thus, it is possible to reduce the development load in the development stage, and provide an environment capable of speedily responding to user's needs after release of a game, and improving the convenience for the user. The present embodiment is particularly advantageous in searching for data having high frequency of update, or data having high "posted content" property. When the portal site is used from a smartphone or the like, entry of the member ID is requested. However, when the portal site is used from the game program by using the CB activation, entry of the member ID is not necessary. In the mode of the DB activation from the game program, even a user who does not have a member ID is allowed to use the portal site. For example, in the case of "purchase of additional content" which is generally known, since a payment process or the like is required, a process such as "sign-in" is essential. However, in the system (particularly, the mode of "instant route") of the present embodiment, such "sign-in" is not necessary, whereby the convenience for the user can be improved.

In the present embodiment, when the web browser is activated by CB activation in the "instant route" mode and thereafter the return value is returned to the game program, the process of the web browser program is shifted to the background. However, the process of the web browser program may be ended at the timing when the return value is returned.

In another embodiment, when the web browser program 222 of the game apparatus 101 is used, even if it is not activated by the CB activation, the page of the portal site including the "immediately" button 155 may be displayed. In this case, for example, the closed URL is not used but only the open-to-public URL is used, and whether the portal site is accessed from the game apparatus 101 or another information processing apparatus is determined by using the user agent. Only when the portal site is accessed from the game apparatus 101, the web page including the "immediately" button 155 may be dynamically generated. Then, in the process of the web browser program 222, when detecting that the "immediately" button 155 is clicked, the game process by the game program 221 is activated at that time to execute the process of giving the course ID or the like relating to the "immediately" button 155 to the game process. Then, in the game process, the process of downloading the course data from the content server 103 by using the given course ID or the like may be executed.

In the web page of the portal site in the portal server 104, information relating to the courses is displayed as shown in FIG. 7, FIG. 8, and the like. Regarding the information relating to the courses, the portal site 104 may be connected to the content server 103 to acquire the information relating to the courses (e.g., the course ID and the like) from the content server 103. For example, in the case where the portal server 104 and the content server 103 are in the same premise, these serves may be connected to each other via a LAN (Local Area Network). Alternatively, the portal server 104 and the content server 103 may be connected to each other via the above-described dedicated network.

In another embodiment, when the CB activation is performed, information indicating the characteristics of the user may be included in the argument given to the web browser program. For example, the number of courses the user has cleared, IDs of the courses the user has cleared, and the like may be included in the argument. That is, for example, a character string indicating the number of the cleared courses may be added to the character string of the closed URL when the portal server 104 is accessed. Then, in the portal server 104, for example, the content displayed on the top page of the portal site may be dynamically customized in accordance with the characteristics of the user. For example, since a user having a large number of cleared courses is considered to be accustomed to playing the game, a list in which courses having relatively high difficulties are picked up may be displayed on the top page.

In the above embodiment, the "course data" is searched for and downloaded. The system according to the present embodiment is applicable not only to the "course data" but also to the following data (products). Specifically, it is assumed that a large number of types of "figures" cooperative with the game process are on the market. The figures are equipped with IC tags, for example, and the game apparatus 101 is equipped with a function to read the IC tags. In this case, it is assumed that a game that uses the figures is released. In the stage of developing this game, since the figures being on the market at this point in time are known, it is possible to create a game intended to use these figures. However, it is considered that a new type of figure may be released after release of the game. In this case, game data corresponding to the new type of figure, e.g., image data corresponding to the figure, is downloaded from a predetermined server by using the (CB-activated) web browser (based on the assumption that the user has purchased the figure). Then, the image data is outputted to the game process side from the web browser as a "return value", and a process of associating the image data with the new type of figure may be executed in the game process. Thus, even when the new type of figure is released after release of a game, it is possible to execute the game process using the figure without the necessity of updating the game program itself.

The game system according to the present disclosure may also be applied to a process as follows. In the above-described game process, a user creates a game course. Parts of a course to be used when the course is created may be added after release of the game so that the user can use the parts. For example, the web browser is activated by CB activation from the game program to access the portal site. In the portal site, the user is allowed to search for the additional course parts, and download image data thereof, parts IDs, and the like. It is assumed that the amount of data for the course parts is as small as several 100 KB. The user selects course parts he/she wants to use from the portal site, and downloads the course parts. Then, download data is returned as a return value to the game process. In the game process, the download course data is expanded in the main memory 113 (when the game process is ended, the additional course data is erased). The user creates a course by using the course data, and uploads the course to the content server 103. Thereafter, when another user downloads this course, for example, the content server 103 determines whether or not the additional parts are used, and when the additional parts are used, the content server 103 allows the user to download the data of the additional parts together with the course data. Thus, the user is allowed to create the course by using the parts added after release of the game without the necessity of updating the game program itself, and moreover, another user is allowed to download and play the course created by using the parts.

While in the above embodiment the game process has been described, the present disclosure may also be applied a process as follows. For example, a case is assumed in which real-estate information application is operated as native application on the game apparatus 101, and data of real-estate properties is treated like the above-described course data. That is, the web browser is activated by CB activation from the real-estate information application, and search for a real-estate property is performed on the web browser, and then a return value indicating a property ID, for example, is returned to the real-estate information application. In the real-estate information application, based on the return value, data of the real-estate property is downloaded from a predetermined server. Then, as a process in the real-estate information application, a 3D model based on the data of the real estate property is generated in a virtual space so that the user can virtually browse the interior of the real-estate property.

What is claimed is:

1. A game system including a game apparatus and first and second servers configured to communicate with the game apparatus, wherein
    the game apparatus includes at least one processor configured to execute a web browser program and request the first server to transmit a web page, in a web browser process according to execution of the web browser program,
    the first server includes a first transceiver configured to transmit the web page to the game apparatus in response to the request from the game apparatus, and
    the at least one processor of the game apparatus is further configured to cause the game apparatus to at least:
        display, in the web browser process, the web page transmitted from the first server;
        acquire, in the web browser process, first access destination information from the first server on the basis of operation data indicating an operation performed on the web page by a user;
        output, from the web browser process, the first access destination information so that the first access destination information becomes usable in a game process according to execution of a game program;
        receive, in the game process according to execution of the game program, the first access destination information outputted from the web browser process;
        convert the received first access destination information into second access destination information, in the game process; and
        request the second server to transmit to the game apparatus, without using the first server as an intermediary, content corresponding to the second access destination information, in the game process,
    the second server includes a second transceiver configured to transmit the content to the game apparatus in response to the request from the game apparatus, and
    the game apparatus is further configured to execute the game process using the content transmitted from the second server.

2. The game system according to claim 1, wherein the at least one processor of the game apparatus is further configured to:
    in the game process, activate the web browser program with a URL of the web page being specified, and
    request the web page, in the web browser process according to execution of the activated web browser program.

3. The game system according to claim 2, wherein the at least one processor of the game apparatus is further configured to activate the web browser program with a request for a return value from the web browser program being further specified.

4. The game system according to claim 3, wherein the first access destination information is output as the return value.

5. The game system according to claim 1, wherein the first access destination information included in the web page is acquired, on the basis of the operation data.

6. The game system according to claim 1, wherein:
the first server is configured to provide the first access destination information,
the second server is configured to store the content,
the first access destination information is information used to request the content from the second server, and
the content is requested from the second server, on the basis of the first access destination information.

7. The game system according to claim 6, wherein:
the first access destination information is information indicating a character string which is not a link to the second server,
the second access destination information is information indicating a download link of the content stored in the second server, and
the at least one processor of the game apparatus is further configured to request the content from the second server, by using the second access destination information.

8. The game system according to claim 6, wherein the second server and the game apparatus are connected to each other via a dedicated network, and only a request from the game apparatus is allowed as a request to the second server.

9. The game system according to claim 6, wherein the first server is connected to the second server, is configured to acquire content information relating to the content from the second server, and is configured to generate the web page on the basis of the content information.

10. The game system according to claim 1, wherein the at least one processor of the game apparatus is further configured to:
activate the web browser program when the game process performed using the content is ended and then a prescribed operation performed by the user is received, and
request the web page from the first server and cause display of the web page, in the web browser process according to execution of the web browser program.

11. The game system according to claim 10, wherein the at least one processor of the game apparatus is further configured to access a web page on which information about the content relating to the ended game process is displayed, and cause display of the web page of the information about the content.

12. The game system according to claim 1, wherein:
in the web browser process, at least a first button image and a second button image are included in the displayed web page,
the at least one processor of the game apparatus is further configured to acquire the first access destination information corresponding to the second button image when the operation data indicates an operation to select the second button image,
when the operation data indicates an operation to select the first button image, information indicating content associated with the first button image is registered, in list data stored in the first server, and
the at least one processor of the game apparatus is further configured to:
acquire the list data from the first server in response to an operation performed by the user; and
acquire, from the second server, the content corresponding to the information stored in the list data, in response to an operation performed by the user.

13. The game system according to claim 12, wherein when an operation to access the server is received,
in the web browser process activated in response to a call-up from the game process, a first URL is specified, and the web page including the first button image and the second button image is acquired, and
in the web browser process activated not by a call-up from the game process, a second URL different from the first URL is specified, and a web page in which the second button image is not included is acquired.

14. The game system according to claim 12, wherein:
the game system includes a general-purpose information processing apparatus,
the information processing apparatus is configured to display a web page in which the first button image is included and the second button image is not included, in the web browser process according to execution of the web browser program, and
the game system is configured to register, in the list data, information indicating the content associated with the first button image, when the operation performed on the web page by the user is an operation to select the first button image.

15. The game system according to claim 1, wherein the content is data for constructing a virtual game space in a game process in which player objects are controlled, and is data created and posted by a user.

16. The game system according to claim 1, wherein the content is data to be temporarily used for a process using the content in the game process.

17. A game process controlling method for a computer of a game apparatus, the method comprising:
generating for display a web page by accessing a first server, in a web browser process according to execution of a web browser program;
in the web browser process, acquiring first access destination information from the first server on the basis of operation data indicating an operation performed on the web page by a user;
in the web browser process, outputting the first access destination information so that the first access destination information becomes as to be usable in a game process according to execution of a game program;
in the game process according to execution of the game program, receiving the first access destination information outputted from the web browser process;
converting the received first access destination information into second access destination information, in the game process;
without using the first server as an intermediary, in the game process, accessing a second server on the basis of the second access destination information, and acquiring content corresponding to the second access destination information from the second server; and
in the game process, executing the game process using the acquired content.

18. The method according to claim 17, wherein the first access destination information is information indicating a character string which is not a link to the second server, and the second access destination information is information indicating a download link of the content stored in the second server,
the method further comprising requesting content from the second server, by using the second access destination information.

19. The method according to claim 17, wherein the second server and the game apparatus are connected to each other via a dedicated network, and only a request from the game apparatus is allowed as a request to the second server.

20. The method according to claim 17, further comprising:

activating the web browser program when the game process performed using the content is ended and then a prescribed operation performed by the user is received, and requesting the web page from the first server and causing display of the web page, in the web browser process according to execution of the web browser program.

21. The method according to claim 17, wherein the content is data for constructing a virtual game space in a game process in which player objects are controlled, and is data created and posted by a user.

22. A game apparatus including:

at least one processor configured to:

generate for display a web page by accessing a first server, in a web browser process according to execution of a web browser program;

in the web browser process, acquire first access destination information from the first server on the basis of operation data indicating an operation performed on the web page by a user;

in the web browser process, output the first access destination information so that the first access destination becomes usable in a game process according to execution of a game program;

in a game process according to execution of the game program, receive the first access destination information outputted from the web browser process;

convert the received first access destination information into second access destination information, in the game process;

without using the first server as an intermediary, in the game process, access the second server on the basis of the second access destination information, and acquire content corresponding to the second access destination information from the second server; and in the game process, execute the game process using the acquired content.

* * * * *